(12) United States Patent
Nishizawa et al.

(10) Patent No.: US 7,802,475 B2
(45) Date of Patent: Sep. 28, 2010

(54) ACCELERATION SENSOR

(75) Inventors: Ryuta Nishizawa, Suwa (JP); Masako Tanaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 11/860,946

(22) Filed: Sep. 25, 2007

(65) Prior Publication Data

US 2008/0087083 A1 Apr. 17, 2008

(30) Foreign Application Priority Data

| Oct. 13, 2006 | (JP) | ............................. 2006-279508 |
| Jan. 29, 2007 | (JP) | ............................. 2007-017439 |
| Jun. 18, 2007 | (JP) | ............................. 2007-159831 |

(51) Int. Cl.
  *G01P 15/08* (2006.01)
  *G01P 15/09* (2006.01)
  *G01P 15/10* (2006.01)
  *G01P 15/097* (2006.01)
(52) U.S. Cl. ................................. 73/514.29; 73/514.34
(58) Field of Classification Search .............. 73/514.34, 73/514.29, 514.16, 514.01
See application file for complete search history.

(56) References Cited

U.S. PATENT DOCUMENTS

| 3,238,789 | A | * | 3/1966 | Erdley ....................... 73/514.29 |
| 3,505,866 | A | * | 4/1970 | Paros et al. ................ 73/862.59 |
| 4,299,122 | A | * | 11/1981 | Ueda et al. ................ 73/862.59 |
| 4,479,385 | A | * | 10/1984 | Koehler .................... 73/514.29 |
| 4,658,175 | A | * | 4/1987 | Albert ...................... 310/323.21 |
| 4,773,493 | A | * | 9/1988 | Goodier ................. 177/210 FP |
| 5,165,279 | A | * | 11/1992 | Norling et al. ............. 73/514.14 |
| 5,331,242 | A |   | 7/1994 | Petri |
| 5,677,485 | A | * | 10/1997 | Nakamura .................... 73/497 |
| 6,546,801 | B2 | * | 4/2003 | Orsier et al. .............. 73/514.38 |
| 6,595,054 | B2 | * | 7/2003 | Paros et al. .............. 73/504.04 |
| 6,826,960 | B2 | * | 12/2004 | Schaad et al. ............. 73/514.29 |
| 7,024,934 | B2 | * | 4/2006 | Yu .......................... 73/514.37 |
| 7,444,883 | B2 | * | 11/2008 | Novack ....................... 73/826 |
| 7,467,553 | B2 | * | 12/2008 | Meyer ..................... 73/514.29 |

FOREIGN PATENT DOCUMENTS

| JP | U-02-32229 | 2/1990 |
| JP | A 02-248865 | 10/1990 |
| JP | A 06-043179 | 2/1994 |
| JP | A 07-191052 | 7/1995 |
| JP | A 08-146033 | 6/1996 |
| JP | A-2000-206141 | 7/2000 |

* cited by examiner

*Primary Examiner*—Helen C. Kwok
(74) *Attorney, Agent, or Firm*—Oliff & Berridge, PLC

(57) ABSTRACT

An acceleration sensor having a vibrating body includes: a base fixed to a pedestal; an oscillating arm extended from the base in a beam-like shape, oscillating transversally in a planer direction at a predetermined resonant frequency. Here, the oscillating arm includes: an oscillating block defined by a through hole opened through a thickness direction at a widthwise center of the oscillating arm, the through hole extending in a lengthwise direction thereof; an added mass being a junction of a distal end of the oscillating block defined by the through hole; and an excitation means installed on the oscillating arm. At this time, the oscillating arm is supported by the base and by the added mass, either in a pseudo-dual anchor structure or a single anchor structure. With the above configuration, the acceleration sensor detects a resonant frequency variability of the vibrating body caused by an inertial effect of the added mass under acceleration.

6 Claims, 10 Drawing Sheets

ACCELERATION SENSOR

BACKGROUND

1. Technical Field

The present invention relates to an acceleration sensor that detects the frequency change of a vibrating body when an acceleration is impressed.

2. Related Art

A known acceleration sensor includes a spiral spring, a resonator, and is formed with silicon having a vibrating mass suspended to a frame, where acceleration is detected based on a frequency change of a resonator, and where the spiral spring, the frame, and the vibrating mass are formed by structuring the silicon platelet. JP-A-6-43179 (page 3; FIG. 1) is an example of such related art.

Another known acceleration sensor includes: a cantilever, one end thereof anchored on a silicon wafer substrate, the other end thereof being a resilient free end; a piezoelectric element film formed on a surface of the cantilever; a piezoelectric resonator formed including metallic electrodes formed on both sides of the piezoelectric element film and a weight fixed to the free end of the cantilever. JP-A-2-248865 (page 2-3, FIGS. 3 and 9) is an example of such related art.

Another known acceleration sensor includes: a plated vibrating body; piezoelectric elements formed on the vibrating body facing each other; a supporting means supporting one end of the vibrating body; and a hole formed in a vicinity of one end of the vibrating body. Here, the vibrating body oscillates in longitudinal direction (i.e. longitudinal oscillation). The vibrating body and the piezoelectric element are bent due to the acceleration impressed in the oscillating direction of the vibrating body, and the acceleration sensor detects voltages generated by this bend in the piezoelectric element. JP-A-8-146033 (page 3, FIGS. 1 and 2) is an example of such related art.

Another known acceleration sensor includes: an inertial mass movable with acceleration; a support beam that supports the inertial mass and deforms when the inertial mass moves; and an resonance body disposed on the support beam; where the resonance body includes an excitation unit, a receiving unit that detects the excitation state, and a propagation unit that propagates the oscillation from the excitation unit to the receiving unit. Here, the magnitude of impressed acceleration is measured by detecting, with a usage of an input signal input into the excitation unit as well as an output signal output toward the receiving unit, the change in the oscillation state of the resonance body, deforming in accordance with the deformation of the support beam when the acceleration is impressed. JP-A-7-191052 (page 1-2, FIG. 1) is an example of related art.

The acceleration sensor according to JP-A-6-43179 detects the amount of frequency variability of the resonator caused by a bent of an accelerated spiral spring. Moreover, the vibrating mass is added in order to increase the detection sensitivity. Similarly in JP-A-2-248865, adding a weight in the end of the cantilever increases the detection sensitivity. Such vibrating mass and the weight are disposed in the direction to which acceleration is impressed. Therefore, as the energy necessary for oscillating the vibrating body increases, the impact strength may decrease.

Another problem involved here is the difficulty in making the acceleration sensor smaller.

The vibrating body according to JP-A-8-146033 oscillates in longitudinal oscillation. The amount of frequency variability in longitudinal oscillation is significantly smaller than that of a transversal vibration, resulting in a problem of difficulty in increasing detection sensitivity. Moreover, the supporting structure of the vibrating body becomes complex and therefore vibration loss may easily occur.

Still further, the structure of the vibrating body is such that a hole is formed in a vicinity of one end of the vibrating body, therefore easily causing a stress concentration, resulting in the decline of the impact strength.

The acceleration sensor according to JP-A-7-191052 has a structure to detect the deformation of the support beam using the resonance body adhered to the support beam. The support beam and the resonance body are made of different materials, and the thermal expansion coefficients thereof are different from one another. This causes the difference in the amount of deformation between the support beam and the resonance body when the temperature changes, and this deformation difference is output as frequency variability, resulting in a problem of poor temperature characteristics.

Further, propagation loss of a force provided by acceleration occurs at the section where the support beam and the resonance body are adhered together, and the long-term reliability is less likely to be ensured in such adhered section.

The precise detection of acceleration requires the positional precision of the resonance body in relation to the support beam. However, since the support beam and the resonance body are formed with different members, the positional precision is harder to achieve. This leads to a prediction of an increase in the manufacturing cost as well as of a difficulty in decreasing the size thereof.

SUMMARY

The present invention is made in order to resolve at least part of the aforementioned problems, and is realized in accordance with the following aspects of the invention.

According to a first aspect of the invention, an acceleration sensor having a vibrating body includes: a base fixed to a pedestal; an oscillating arm extended from the base in a beam-like shape, oscillating transversally in a planer direction at a predetermined resonant frequency. Here, the oscillating arm includes: an oscillating block defined by a through hole opened through a thickness direction at a widthwise center of the oscillating arm, the through hole extending in a lengthwise direction thereof; an added mass being a junction of a distal end of the oscillating block defined by the through hole; and an excitation electrode installed on the oscillating arm. At this time, the oscillating arm is supported by the base and by the added mass, either in a pseudo-dual anchor structure or a single anchor structure. With the above configuration, the acceleration sensor detects a resonant frequency variability of the vibrating body caused by an inertial effect of the added mass under acceleration.

Here, the pseudo-dual anchor structure indicates an anchoring structure in which, for instance, the base of the vibrating body is a fixed end and a distal end of the oscillating arm which is equivalent to an added mass is a free end, while the distal end hardly oscillates due to the large mass of the added mass.

According to the above first aspect, acceleration is detected by utilizing the inertial effect of the added mass caused by the acceleration. The inertial effect generates expansion-contraction stress (tensile stress and compression stress) in the oscillating arm, which causes a change in the resonant frequency of the vibrating body. Specifically, the resonant frequency increases when the tensile stress occurs in the oscillating arm, and the resonant frequency decreases when the compression stress occurs in the oscillating arm. This vibrating body oscillates in a high-order transversal oscillation with a pseudo-dual anchor structure, when the added mass is large enough. It oscillates linearly and transversally when the added mass is small. This vibrating body provides an acceleration sensor with a high detection sensitivity, since the resonant frequency variability caused by the acceleration is larger than the one produced in the longitudinal oscillation used in the aforementioned known technique.

Moreover, the through hole opened in the oscillating arm decreases the cross-sectional area of the oscillating blocks, thereby making the distance between the excitation electrodes disposed as the excitation means on the lateral surfaces shorter. Consequently, this provides the acceleration sensor with higher field effect mobility, thereby reducing the consumption current.

Further, the through hole divides the oscillating arm into two oscillating blocks with small cross-sectional areas. This enlarges the expansion-contraction stress generated in the bendable portion caused by the acceleration, increasing the amount of resonant frequency variability, thereby improving the detection sensitivity of the sensor.

The acceleration sensor according to the above aspect of the invention has a structure which detects the resonance frequency variability caused by the expansion-contraction stress generated in the oscillating arm. Consequently, such structure allows a smaller packaging for the vibrating body. The minimum amount of space for the oscillating arm 21 to oscillate transversally is sufficient, since the degree of expansion and contraction caused by the acceleration is very small in the longitudinal direction of the oscillating arm.

The acceleration sensor according to the above aspect of the invention has the base and the oscillating arm that are formed to be monolithic. This provides the acceleration sensor with superior temperature characteristics, compared to the structure where the support beam and the resonance body are formed separately and thereafter are adhered, as described in the aforementioned related art (JP-A-7-191052). In the latter structure, the difference in their thermal expansion coefficients causes the difference in a magnitude of deformation of the support beam and of the resonance body, resulting from a temperature deviation, and this deformation difference is output as frequency variability.

The monolithic structure does not have an adhered section in contrast to the structure where the support beam and the resonance body are adhered together as described in related art. The effects of such structure is that no propagation loss of a force provided by acceleration occurs at the adhered section, and that the long-term reliability is ensured.

Moreover, since the base and the oscillating arm are formed to be coplanar and monolithic, no protrusion is present in the thickness direction, thereby making the acceleration sensor thinner.

In this case, it is preferable that a pair of vibrating bodies be provided, each vibrating body including the base, the oscillating arm, and the added mass; and that the added masses be a shared added mass. It is also preferable that the pair of vibrating bodies be coupled linearly so as to be point-symmetric with respect to a center of mass of the shared added mass.

With such configuration, a structure is formed including a pair of vibrating bodies facing each other, having the added mass therebetween. At this time, due to the sufficient mass in the added mass, these counterfacing oscillating arms have, a high-order transversal oscillation mode, oscillating linearly and transversally in a reversed-phase. Consequently, a vibrating body is provided with a good oscillation balance, thereby the vibration body obtains a high-Q.

If acceleration is impressed, one of the adjacent oscillation blocks receives compression stress and the other oscillation block receives tensile stress. In such structure, there is an effect to negate the influence of the temperature-frequency characteristics, by detecting the resonant frequency differential of both vibrating bodies.

In this case, it is preferable that the oscillating blocks be formed, being curved so as to be symmetric with respect to a central axis of the oscillating arm; and that a resonant frequency variability be detected by utilizing a change in a sectional shape being in parallel to a surface perpendicular to an axis direction of the oscillating blocks. Here, the change is caused by an inertial effect of the added mass when acceleration is impressed to an axis direction of the oscillating arm.

With such structure in which the oscillating blocks are curved, the sectional shapes of the oscillating blocks change due to their buckling deformation during acceleration in the axis direction of the oscillating arm, and therefore a second moment of area of the oscillating arm changes. In the transversally oscillating arm, the resonant frequency increases as the second moment of area becomes larger, and it decreases as the second moment of area becomes smaller. The amount of resonant frequency variability can be accurately measured with a device such as a frequency counter, and therefore the acceleration detection can be carried out in a high precision.

Compared to the known aforementioned acceleration sensor that, for instance, bends and deforms due to the weight at the end of the cantilever, this acceleration sensor includes the oscillating blocks which distort, curving outward by acceleration. Therefore, this acceleration sensor has a larger the structural strength, and is capable of detection in a strongly accelerated area.

By forming the oscillating block curved in advance, the amount of variability increases in the oscillating block, due to the acceleration in the axis direction. The amount of resonant frequency variability therefore rises, thereby allowing the increase of the detection sensitivity.

It is preferable that, in the acceleration sensor according to the first aspect of the invention, the added mass be provided with a mass equal to or greater than that of the base; and that the oscillating arm be supported in a pseudo-dual anchor structure at the base and at the added mass, so that the oscillating arm oscillates in a high-order transversal oscillation.

Sufficiently increasing the added mass in proportion to the oscillating arm significantly restricts the movement of the distal end of the oscillating arm. Since the added mass and the base constitute the pseudo-dual anchor structure in the oscillating arm, the oscillating arm therefore oscillates in a high-order transversal oscillation mode. Such oscillating arm formed including the curved oscillating blocks provides an acceleration sensor with the high detection sensitivity.

In this case, it is preferable that a pair of vibrating bodies be provided, each vibrating body including the base, the oscillating arm, and the added mass; and that the added masses be a shared added mass. It is also preferable that the pair of vibrating bodies be coupled linearly so as to be point-symmetric with respect to a center of mass of the shared added mass.

With such configuration, a vibrating body in the pseudo-dual anchor structure is formed, including a pair of vibrating bodies that have the curved oscillating arms, the vibrating bodies facing each other, having the added mass therebetween. At this time, the oscillating arms of the counterfacing vibrating bodies have a high-order transversal oscillation mode, thereby forming a vibrating body with good oscillation balance, in other words, the vibration body obtaining a high-Q.

According to a second aspect of the invention, an acceleration sensor including a vibrating body, comprising: a base fixed to a pedestal; a plurality of oscillating arms extended in parallel to each other from the base in a beam-like shape, oscillating transversally in a planer direction at a predetermined resonant frequency; and an added mass having a mass equal to or larger than that of the base which couples the plurality of oscillating arms at distal ends thereof. Here, the plurality of oscillating arms each includes: at least one through hole opened through a thickness direction at a widthwise center of the oscillating arm, the through hole extending in a lengthwise direction thereof, and an excitation electrode provided in a range within an internal surface of the through hole and within both lateral surfaces of the plurality of oscillating arms, the range including at least a position where a deformation caused by an oscillation is large. Here, the acceleration sensor detects a resonant frequency variability of the vibrating body caused by an inertial effect of the added mass under acceleration.

The vibrating body with such structure may be referred to as a "double-ended tuning fork resonator", if it has two oscillating arms. In such double-ended tuning fork resonator shape, the two oscillating arms oscillate in a reversed-phase, providing the benefits of less leakage and higher oscillation efficiency. That is to say, the vibrating body obtains a high-Q, and the detection resolution of acceleration is improved.

The cross-sectional area of the oscillating arm decreases due to the through hole opened therein. This increases the level of disposition in the oscillating arm during the acceleration, thereby increasing the detection sensitivity.

Further, the field effect increases since the distance between the excitation electrodes becomes shorter. This provides an effect of lowering the power consumption.

It is preferable that, in the acceleration sensor according to the second aspect of the invention, the through holes be opened in a vicinity of a junction of the plurality of oscillating arms and the base, as well as of a junction of the added mass and the plurality of oscillating arms.

In the transversal oscillation of the pseudo-dual anchor structure, the magnitude of deformation generated during the oscillation is large at the vicinity of the junction of the oscillating arm and the base, as well as at the vicinity of the junction of the oscillating arm and the added mass. Therefore, by providing the through holes in positions where the magnitude of deformation is large, and thereafter installing the excitation electrodes on the internal and the external lateral surfaces of the through holes, the distance between the excitation electrodes becomes shorter, thereby increasing the field effect and reducing the power consumption. The vicinity of the junction of the oscillating arms and the base indicates a range up to approximately 30% of the total length of the oscillating arms from their end at the base side. Similarly, the vicinity of the junction of the oscillating arms and the added mass indicates a range up to approximately 30% of the total length of the oscillating arms from their end at the added mass side.

It is preferable that, in the acceleration sensor according to the second aspect of the invention, the through holes be opened in: a vicinity of a junction of the plurality of oscillating arms and the base; a vicinity of a junction of the plurality of oscillating arms and the added mass; and lengthwise centers of the plurality of oscillating arms.

Here, the lengthwise center indicates the range distributed in approximately 60% of the total length of the oscillating arms, having the center of the oscillating arm in the longitudinal direction as a baseline.

When the double-ended tuning fork resonator oscillates transversally, the positions where the magnitude of deformation is large during the oscillation are also present in the vicinity of the lengthwise center of the oscillation arms, i.e. the outer curve of the oscillation curve. Therefore, the field effect is further increased and the power consumption is reduced, by providing the through holes in the lengthwise center of the oscillation arm, and in the vicinity of the junction of the oscillation arm and the base, as well as of the junction of the oscillation arm and the added mass, and by thereafter installing the excitation electrodes on the internal and the external lateral surfaces of those through holes.

In this case, it is preferable that a pair of vibrating bodies be provided, each vibrating body including the base, the oscillating arm, and the added mass; and that the added masses be a shared added mass; as well as that the pair of vibrating bodies be coupled linearly so as to be point-symmetric with respect to a center of mass of the shared added mass.

With such configuration, a vibrating body with the pseudo-dual anchor structure is formed, including a pair of vibrating bodies facing each other, having the added mass therebetween. At this time, the oscillating arms of the counterfacing vibrating bodies have a high-order transversal oscillation mode, thereby forming a vibrating body with good oscillation balance, in other words, the vibration body obtaining a high-Q.

It is preferable that, in the acceleration sensor according to the above aspects of the invention, the vibrating body be formed with quartz.

There is not specific limitation imposed on the type of materials used in the vibrating body, as far as the material is piezoelectric. However, if quartz is used, it allows the manufacturing of the vibrating body and the through hole 22 integrally with ease and with high precision using the photolithography technique, thereby providing the vibrating body with good temperature-frequency characteristics.

It is preferable that, in the acceleration sensor according to the above aspects of the invention, the vibrating body be formed with a constant modulus material, and that a piezoelectric film be formed on a lateral surface of the oscillating arm.

Examples of the constant modulus materials include nickel, iron, chromium, titanium, elinvar alloys formed using those elements, and iron-nickel alloy.

By using the constant modulus materials for the vibrating body, the structural strength thereof increases, and the acceleration sensor is capable of detection in a strongly accelerated area.

BRIEF DESCRIPTION OF THE DRAWINGS

The invention will be described with reference to the accompanying drawings, wherein like numbers reference like elements.

FIG. 1A is a top view thereof, and FIG. 1B is a sectional view of a section H-H in FIG. 1A.

FIG. 5A is a front elevational view thereof, and FIG. 5B is a sectional view of a section J-J in FIG. 5A.

FIG. 7A is a front elevational view thereof, and FIG. 7B is a sectional view of a section K-K in FIG. 7A.

FIG. 8A is perspective view thereof, FIGS. 8B to 8D are sectional views of a section H-H in FIG. 8A.

FIG. 11A is a front elevational view thereof, and FIG. 11B is a partial front elevational view magnifying a structure of excitation electrodes.

FIG. 13A is a front elevational view thereof, and FIG. 13B is a partial plan view illustrating a structure of excitation electrodes.

FIG. 14A is a front elevational view thereof, and FIG. 14B is a partial plan view illustrating a structure of excitation electrodes.

DESCRIPTION OF EXEMPLARY EMBODIMENTS

Embodiments of the invention will now be described with references to accompanying drawings.

FIGS. 1A to 5B illustrate an acceleration sensor according to a first embodiment. Similarly, FIG. 6 illustrates a second embodiment, FIGS. 7A and 7B a third embodiment, FIGS. 8A to 8D a fourth embodiment, FIG. 9 a fifth embodiment, FIG. 10 a sixth embodiment, FIGS. 11A to 12 a seventh embodiment, FIGS. 13A and 13B an eighth embodiment, FIGS. 14A and 14B a ninth embodiment, and FIG. 15 a tenth embodiment of the acceleration sensor.

The drawings referred to in the following descriptions are all schematic drawings in which the vertical and horizontal scales of members and sections shown therein are not proportional to the actual ones.

First Embodiment

Figures 1A, 1B:
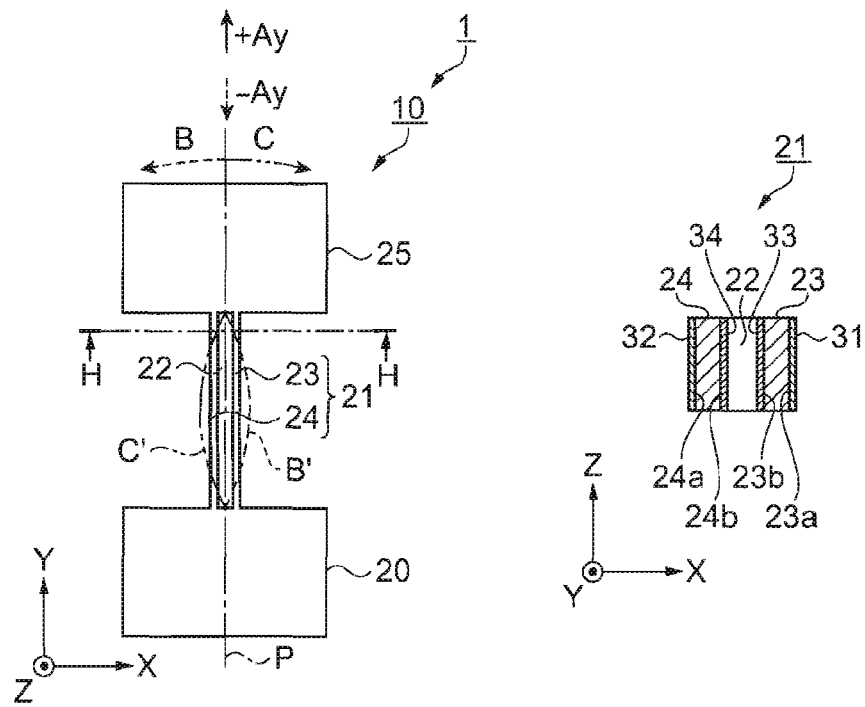
FIGS. 1A and 1B illustrate an example of an acceleration sensor according to one embodiment, where

FIGS. 1A and 1B show an example of an acceleration sensor according to the first embodiment, where FIG. 1A is a front elevational view thereof, and FIG. 1B is a sectional view of a section H-H in FIG. 1A. Referring now to FIG. 1A, an acceleration sensor 1 is formed with a vibrating body 10 that includes: a base 20 anchored to an un-illustrated pedestal; and an oscillating arm 21 extended out like a beam from the side surface of the base 20 and oscillates transversally in a planer direction at a predetermined resonant frequency.

The vibrating body 10 is formed with a piezoelectric material. Piezoelectric materials may include materials such as lead titanate ($PbTiO_3$), lead titanate zirconate (PZT; registered trademark), zinc oxide (ZnO), and quartz. This embodiment exemplifies the usage of high-Q quartz that excels in temperature-frequency characteristics.

The vibrating body 10 is formed with a z-cut expanding in an x-y plane, and the oscillating arm 21 thereof extends in the y-axis direction as a single beam, from the center of one side of the base 20. The base 20 is an anchor for anchoring the vibrating body 10 to the un-illustrated pedestal of a package. A through hole 22 is opened in the center of the width direction (x-axis) of the oscillating arm 21, extending along longitudinal direction (y-axis), penetrating through in the thickness direction (z-axis), i.e. perpendicular to the oscillation of the oscillating arm 21.

An added mass 25 is formed at the distal end (free end) of the oscillating arm 21. In this embodiment, the planer size of the added mass 25 is set so that its mass is equal to or larger than that of the base 20. One end of the through hole 22 reaches the junction of the oscillating arm 21 and the base 20, and the other end reaches a junction of the oscillating arm 21 and the added mass 25.

The size of the added mass 25 may optionally be set as long as it forms the aforementioned pseudo-dual anchor structure.

The through hole 22 divides the oscillating arm 21 into an oscillating block 23 and an oscillating block 24, and the distal ends thereof are coupled by the added mass 25. The oscillating blocks 23 and 24 are symmetric with respect to a central axis P of the oscillating arm 21. Excitation electrodes are formed on the lateral surfaces of these oscillating blocks 23 and 24.

Refereeing now to FIG. 1B, a structure of the excitation electrodes functioning as an excitation means will now be described. An excitation electrode 31 and an excitation electrode 33 are respectively formed on an outer lateral surface 23a and an inner lateral surface 23b of the oscillating block 23. Moreover, an excitation electrode 32 and an excitation electrode 34 are respectively formed on an outer lateral surface 24a and an inner lateral surface 24b of the oscillating block 24. The excitation electrodes 31 to 34 are formed on the approximately entire side lateral surfaces of the through hole 22 in the y-axis direction. The excitation electrodes 31 to 34 also serve as detection electrodes.

The excitation electrodes 31 and 32 have the same electric potential, and the excitation electrodes 33 and 34 have a potential different from that of the excitation electrodes 31 and 32. All of those electrodes are extended toward the surface of the base 20, and are coupled with an un-illustrated oscillation circuit and detection circuit.

If the oscillation circuit inputs excitation signals to the excitation electrodes 31 and 32, as well as excitation signals with inverted potential to the excitation electrodes 33 and 34, then the oscillating arm 21 attempts to oscillate linearly and transversally, having a node of the oscillation at the vicinity of a junction of the oscillating arm 21 and the base 20. However, since the added mass 25 is large enough so that the oscillating arm 21 resonates transversally in second-order curves as shown in FIG. 1A.

That is to say, when the excitation signals are input into the oscillating arm 21, the distal end of the added mass 25 attempts to oscillate in the direction of an arrow C. However, the distal end hardly moves due to presence of the large added mass 25, and the oscillating arm 21 oscillates transversally in a second-order curve as shown in double dashed line C'.

Similarly, when the distal end of the added mass 25 attempts to oscillate in the direction of an arrow B, the movement thereof is actually very little due to the presence of the large added mass 25, and the oscillating arm 21 oscillates transversally in a second-order curve as shown in dotted line B'.

Therefore, while the original structure of the vibrating body 10 is a single anchor structure in which the base serves as an anchor, the vibrating body 10 actually has the pseudo-dual anchor structure in which the added mass 25 and the base 20 functions as if they are both anchors, the mass of the added mass 25 being equal to or larger than that of the base 20. The oscillating arm 21 has a high-order oscillation mode, having oscillation nodes at the vicinities of a junction of the oscillating arm 21 and the base 20, as well as a junction of the oscillating arm 21 and the added mass 25.

An acceleration detection will now be described.

Referring back to FIG. 1A, when the oscillating arm 21 is oscillating in a transversal second-order mode in the x-axis direction at the predetermined resonant frequency, if acceleration +Ay is impressed in +y axis direction, then a compression stress caused by the inertial effect of the added mass 25 occurs at a bendable portion as well as at the junction of the oscillating arm 21 and the base 20. The generation of the compression stress decreases the resonant frequency. On the contrary, if acceleration −Ay is impressed in the −y axis direction, then a tensile stress occurs at the bendable portion as well as at the junction of the oscillating arm 21 and the base 20. The generation of the tensile stress increases the resonant frequency.

The detection circuit detects the change in the resonant frequency, and converts the detected resonant frequency into a voltage in an un-illustrated converting circuit, so as to detect the voltage as acceleration.

The acceleration may also be obtained by capturing the resonant frequency as a phase velocity, and thereafter differentiating the change of the phase velocity with respect to time with a differentiation circuit.

According to the first embodiment described above, acceleration is detected by utilizing the inertial effect of the added mass 25 caused by the acceleration. The inertial effect generates expansion-contraction stress (tensile stress and compression stress) of the oscillating arm 21, which causes a change in the resonant frequency of the vibrating body 10. Specifically, the resonant frequency increases when the tensile stress occurs in the oscillating arm 2, and the resonant frequency decreases when the compression stress occurs in the oscillating arm 21. This vibrating body 10 provides an acceleration sensor with a high detection sensitivity, since the resonant frequency variability caused by the acceleration is larger than the one produced in the longitudinal oscillation used in the aforementioned known technique.

Moreover, the through hole 22 opened in the longitudinal direction of the oscillating arm 21 decreases the cross-sectional area of the oscillating blocks 23 and 24, thereby making the distance between the excitation electrodes disposed on the lateral surfaces shorter. Consequently, this provides the acceleration sensor with higher field effect mobility, thereby reducing the consumption current.

Further, the through hole 22 divides the oscillating arm 21 into two oscillating blocks 23 and 24, reducing the cross-sectional area thereof. This enlarges the expansion-contraction stress generated in the bendable portion caused by the acceleration, increasing the amount of resonant frequency variability, thereby improving the detection sensitivity of the sensor.

Sufficiently increasing the added mass 25 in proportion to the oscillating arm restricts the movement of the distal end of the oscillating arm 21. The added mass 25 and the base 20 constitute the pseudo-dual anchor structure in the oscillating arm 21, and the oscillating arm 21 therefore oscillates in a high-order transversal oscillation mode. Such high-order transversal oscillation mode provides an acceleration sensor with the high detection sensitivity.

The acceleration sensor 1 according to the first embodiment has a structure for detecting the change in the resonant frequency caused by expansion-contraction stress that occurs in the oscillating arm 21. This means that by providing the oscillating arm 21 with the added mass 25 having a large mass increases the tensile stress or compression stress generated during acceleration in the bendable portion. The detection sensitivity of the sensor is thereby increased.

The size of the added mass 25 may optionally be set as long as it forms the aforementioned pseudo-dual anchor structure. Such structure allows a smaller packaging for the vibrating body 10. The minimum amount of space for the oscillating arm 21 to oscillate transversally is sufficient, since the degree of expansion and contraction caused by the acceleration is very small in the longitudinal direction of the oscillating arm 21.

The base 20 and the oscillating arm 21 are monolithic. This provides the acceleration sensor with superior temperature characteristics, compared to the structure where the support beam and the resonance body are formed separately and thereafter are adhered, as described in the aforementioned related art (JP-A-7-191052). In the latter structure, the difference in their thermal expansion coefficients causes the difference in a magnitude of deformation of the support beam and of the resonance body, resulting from a temperature deviation, and this deformation difference is output as frequency variability.

The monolithic structure does not have an adhered section in contrast to the structure where the support beam and the resonance body are adhered together as described in related art. The effects of such structure is that no propagation loss of a force provided by acceleration occurs at the adhered section, and that the long-term reliability is ensured.

The material used in the vibrating body 10 is quartz, and the base 20 and the oscillating arm 21 are coplanar and monolithic. This allows the manufacturing of the vibrating body 10 and its containing blocks such as base 20, the oscillating arm 21, and the through hole 22 integrally with ease and with high precision using the photolithography technique, thereby providing the vibrating body 10 with good temperature-frequency characteristics. Moreover, no protrusion is present in the thickness direction, thereby making the vibrating body 10 thinner. The first embodiment described above exemplifies the pseudo-dual anchor structure, while the embodiment may also be applied to a vibrating body of single anchor structure.

First Modification

Figure 2:
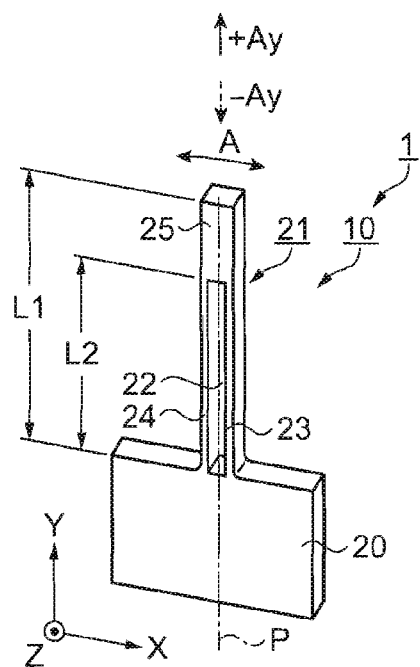
FIG. 2 is a perspective view illustrating a structure of an acceleration sensor according to a modification of the above embodiment.

An acceleration sensor according to a first modification of the first embodiment will now be described with reference to drawings. The first modification is peculiar in that the vibrating body has a single anchor structure and oscillates linearly and transversally. FIG. 2 is a perspective view illustrating a structure of the acceleration sensor according to the first modification. Referring to FIG. 2, the vibrating body 10 functioning as an acceleration sensor has the same configuration as that of the first embodiment (refer to FIGS. 1A and 1B), except for the added mass 25. The detection unit 35 is provided as an extension of the oscillating arm 21, and the through hole 22 divides the vibrating arm 21 into the oscillating blocks 23 and 24.

The excitation electrodes 31 to 34 shown in FIGS. 1A and 1B are disposed on the lateral surfaces of the oscillating blocks 23 and 24. If the oscillation circuit inputs excitation signals to the excitation electrodes 31 through 34, where the excitation electrodes 31 and 32 receive an excitation signal with inverted potential as the one received by the excitation electrodes 33 and 34, the oscillating arm 21 oscillates linearly and transversally, having the vicinity of a junction with the base 20 as a node of oscillation (shown as an arrow A).

The acceleration is detected in the similar manner as that of the first embodiment. That is to say, when the oscillating arm 21 is oscillating linearly in the x-axis direction at the predetermined resonant frequency, if the acceleration +Ay is impressed in +y axis direction, then a compression stress caused by the inertial effect of the added mass 25 occurs at a bendable portion as well as at the junction of the oscillating arm 21 and the base 20. The generation of the compression stress decreases the resonant frequency. On the contrary, if acceleration −Ay is impressed in the −y axis direction, then a tensile stress occurs at the bendable portion as well as at the junction of the oscillating arm 21 and the base 20. The generation of the tensile stress increases the resonant frequency. The detection circuit detects the change in the resonant frequency, and converts the detected resonant frequency into a voltage in an un-illustrated converting circuit, so as to detect the voltage as acceleration.

It is confirmed in simulations and experiments that the amount of frequency variability caused by the acceleration varies by changing the proportion between the length L2 of the through hole 22 and the total length L1 of the oscillating arm.

Figure 3:
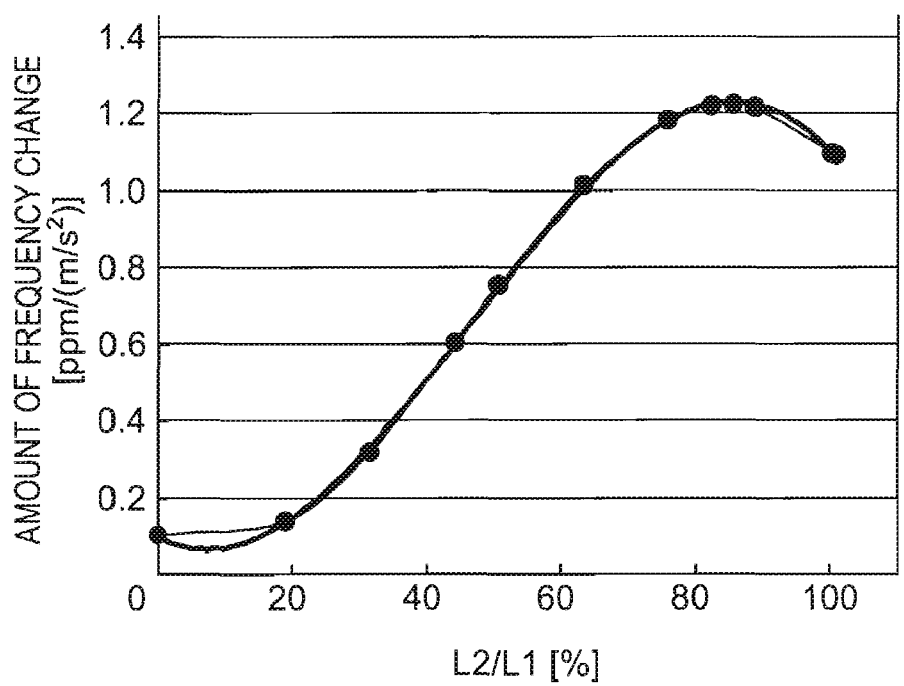
FIG. 3 is a graph illustrating a relationship between the amount of frequency variability and a ratio of a through hole length of L2 to a total oscillating arm length of L1.

FIG. 3 is a graph illustrating a relationship between the amount of frequency variability and a ratio of the through hole length of L2 to the total oscillating arm length of L1. As shown in FIG. 2, the amount of resonant frequency variability (ppm/(m/s$^2$)) with respect to acceleration (m/s$^2$) changes in accordance with the ratio of the length L2 of the through hole 22 to the total length L1 of the oscillating arm (represented as "L2/L1 (%)").

This graph shows that when the L2/L1 is "0", i.e. when the through hole 22 is not present, then the amount of frequency variability is 0.1 ppm/(m/s$^2$), indicating that the acceleration detection is possible even without the through hole 22. However, the frequency variability of 0.1 ppm/(m/s$^2$) is not suitable for practical use, due to its low detection sensitivity.

As the value of L2/L1 increases, the amount of frequency variability increases, becoming the highest in the vicinity of 80%. The graph shows a detection sensitivity of approximately 1 ppm/(m/s$^2$) or more from 60% to 100% on the L2/L1 axis, and such detection sensitivity is preferable for practical use.

According to such first modification, the vibrating body 10 provides the similar effect as that of the aforementioned first embodiment, the vibrating body 10 having the single anchor structure that oscillates linearly and transversally.

Second Modification

An acceleration sensor according to a second modification of the first embodiment will now be described with reference to drawings. The second modification is peculiar in that the free end of the oscillating arm is provided with an added mass which allows the linear and transversal oscillation. Components that are different from that of the aforementioned first embodiment (refer to FIGS. 1A and 1B) will mainly be described. Like reference numerals designate like structure in the first embodiment.

Figure 4:
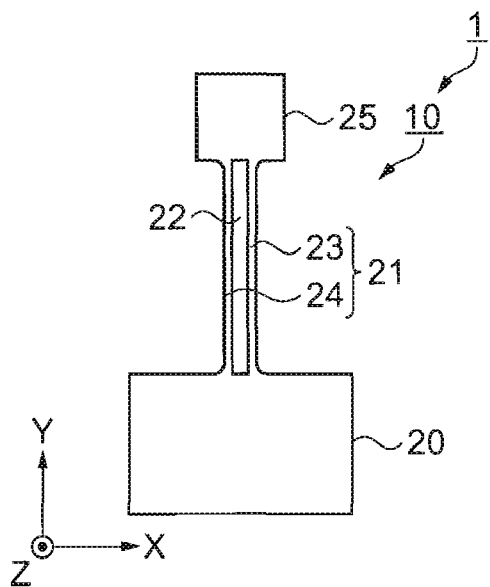
FIG. 4 is a front elevational view illustrating an acceleration sensor according to another modification of the above embodiment.

FIG. 4 is a front elevational view illustrating a vibrating body according to this modification. Referring to FIG. 4, the vibrating arm 21 of the vibrating body 10 extends vertically in the y-axis direction as a beam, from the center of one side of the base 20. A through hole 22 is opened in the center of the width direction (x-axis) of the vibrating arm 21, extending along longitudinal direction (y-axis), penetrating through in the thickness direction (z-axis).

The through hole 22 is formed at a similar position as well as with a similar size as that of the first embodiment (refer to FIGS. 1A and 1B), and the proportion of the length of the through hole 22 with respect to the total length of the oscillating arm 21 including the added mass 25 is very closed to that of the first embodiment. An added mass 25 is formed at the distal end (free end) of the vibrating arm 21. The added mass 25 is set to be larger than that of the first modification (refer to FIG. 2), and smaller than that of the first embodiment (refer to FIGS. 1A and 1B). Therefore, the oscillating arm 21 oscillates linearly and transversally, having the vicinity of a junction with the base 20 as a node of oscillation.

By providing the oscillating arm 21 with such added mass 25, the mass of the oscillating arm 21 increases, and the tensile stress or compression stress generated during acceleration in the bendable portion becomes larger than that of the first modification. Consequently, the detection sensitivity of the sensor is increased.

Third Modification

An acceleration sensor according to a third modification of the first embodiment will now be described with reference to drawings. The third modification is peculiar in that it includes a plurality of oscillating arms, while the aforementioned first embodiment includes a single oscillating arm. Here, the structure having two oscillating arms is described as an example.

Figure 5A:
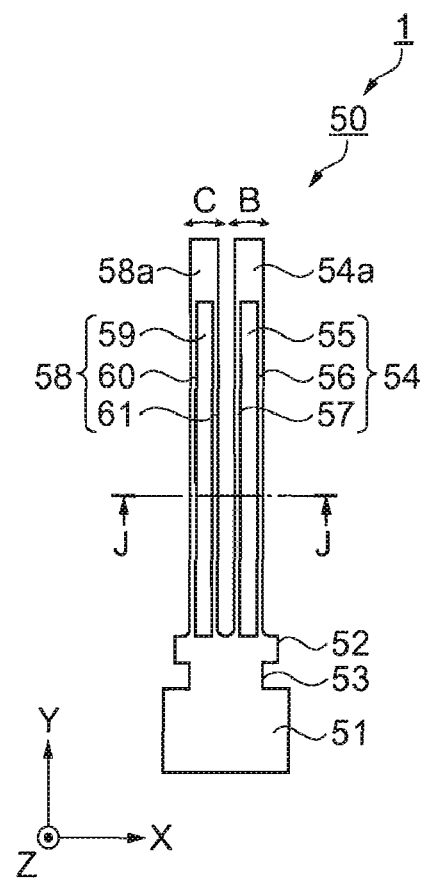
FIGS. 5A and 5B show an acceleration sensor according to another modification of the above embodiment, where
Figure 5B:
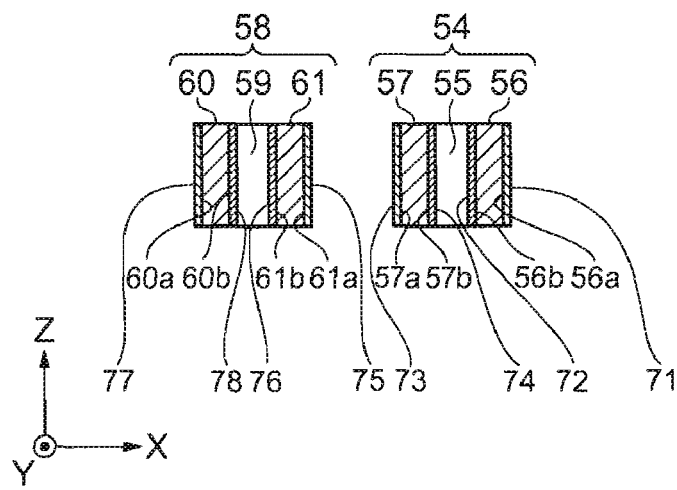
Figure 6:
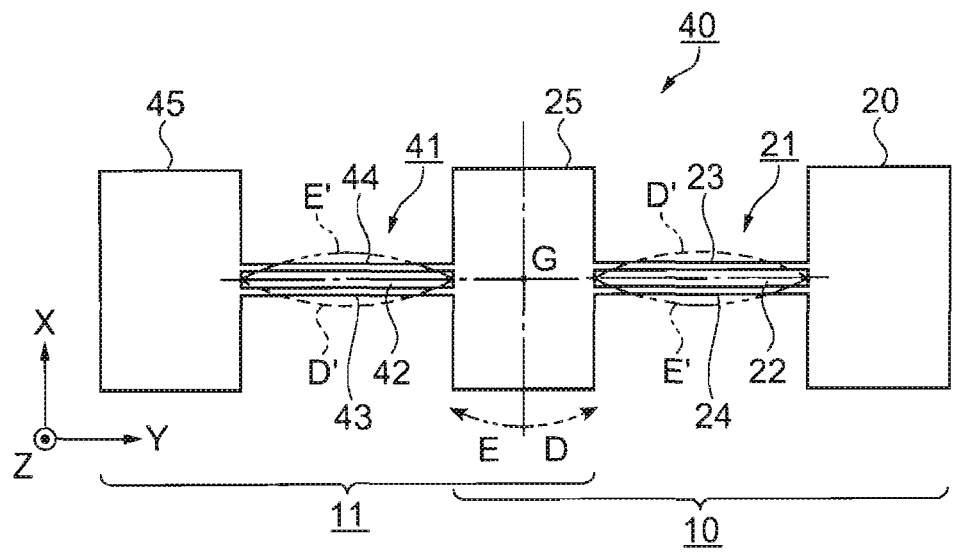
FIG. 6 is a front elevational view illustrating an acceleration sensor according to another embodiment.

FIGS. 5A and 5B show a vibrating body according to the third modification, where FIG. 5A is a front elevational view thereof, and FIG. 5B is a sectional view of a section J-J in FIG. 5A. Referring to FIGS. 5A and 5B, a vibrating body 50 functioning as an acceleration sensor has two oscillating arms 54 and 58 extending vertically from one side of a base 51. The two oscillating arms 54 and 58 are parallel to each other. In other words, this vibrating body 50 is a tuning fork vibrating body.

Through holes 55 and 59 are opened in the widthwise center of the oscillating arms 54 and 58, respectively. The shapes of the oscillating arms 54 and 58 as well as the through holes 55 and 59 are equivalent to those of the oscillating arm 21 and the through hole 22 described in the first embodiment (refer to FIGS. 1A and 1B). The through holes 55 is opened in the vibrating arm 54, dividing it into oscillating blocks 56 and 57, and the through hole 59 is opened in the vibrating arm 58, dividing it into oscillating blocks 60 and 61. The distal ends of the oscillating blocks 56 and 57 are coupled by an added mass 54a, and the distal ends of the oscillating blocks 60 and 61 are coupled by an added mass 58a.

As shown in FIG. 5B, excitation electrodes are formed on each lateral surface of the oscillating blocks 56, 57, 60, and 61. An excitation electrode 71 and an excitation electrode 72 are respectively formed on an outer lateral surface 56a and an inner lateral surface 56b of the oscillating block 56. At the same time, an excitation electrode 73 and an excitation electrode 74 are respectively formed on an outer lateral surface 57a and an inner lateral surface 57b of the oscillating block 57. Moreover, an excitation electrode 77 and an excitation electrode 78 are respectively formed on an outer lateral surface 60a and an inner lateral surface 60b of the oscillating block 60, and an excitation electrode 75 and an excitation electrode 76 are respectively formed on an outer lateral surface 61a and an inner lateral surface 61b of the oscillating block 61.

The same electric potential is provided to a group of excitation electrodes 71, 73, 76, and 78. Similarly, the same electric potential is provided to a group of excitation electrodes 72, 74, 75, and 77. Here, the excitation signal input into the first group has an inverted potential from the other that is input into the second group. Such structure makes the oscillating arms 54 and 58 to oscillate linearly and transversally in the direction of arrows B and C respectively, in reversed-phase in the x-axis direction.

The base 51 is coupled with the oscillating arms 54 and 58 at a junction 52, a region thereof being the node of oscillation. A constriction 53 is formed between the junction 52 and the base 51. The constriction 53 is provided in order to prevent the transmission of the oscillation of the oscillating arms 54 and 58 to the anchor.

As described, this structure is of the tuning fork vibrating body which has a constitutional symmetry, and therefore the oscillating arms 54 and 58 oscillate in a reversed-phase, providing the benefits of less leakage and higher oscillation efficiency.

The through holes 55 and 59 opened in the oscillating arms 54 and 58 decrease the cross-sectional area of the oscillating blocks 54 and 58, thereby increasing the expansion-contraction stress generated therein. This means that the structure which includes a plurality of oscillating arms can increase tensile and compression stress caused by acceleration, raising the resonant frequency variability, thereby increasing the detection sensitivity of the structure.

In this modification, the structure having two oscillating arms is described as an example. However, the number of arms may also be three or more. If there are three arms, the central arm may be used for detection.

Second Embodiment

An acceleration sensor according to a second embodiment will now be described with reference to drawings. The second embodiment is peculiar in that the acceleration sensor has a dual anchor structure, while the aforementioned first embodiment and modifications thereof have either the pseudo-dual anchor structure or the single anchor structure.

FIG. 6 is a front elevational view illustrating the acceleration sensor according to the second embodiment. Referring to FIG. 6, an acceleration sensor 40 is formed including two vibrating bodies, i.e. the vibrating body 10 and a vibrating body 11, coupled linearly at the added mass 25 being shared therebetween.

As shown in FIG. 6, the vibrating body 10 is at the right side from a center of mass G in the acceleration sensor 40, and the vibrating body 11 is at the left side. The vibrating body 10 includes the base 20, the oscillating arm 21, and the added mass 25, and the vibrating body 11 includes a base 45, an oscillating arm 41, and the added mass 25. The oscillating arm 21 is divided, by the through hole 22, into the oscillating blocks 23 and 24 on which the excitation electrodes shown in FIG. 1B are formed.

The oscillating arm 41 is also divided by the through hole 42 into the oscillating blocks 43 and 44 on which the excitation electrodes shown in FIG. 1B are formed. Here, the added mass 25 is a common added mass for the vibrating body 10 and the vibrating body 11. The acceleration sensor 40 is point-symmetric with respect to the center of mass G, and has the dual anchor structure, having the base 20 and the base 45 as anchors, the two vibrating bodies of the vibrating body 10 and the crystal resonator 12 coupled linearly, having the common added mass 25 therebetween. The planer size of the added mass 25 is such that its mass is equal to or larger than that of the bases 20 and 45.

If the oscillating arms 21 and 41 receive the excitation signals, the added mass 25 is hardly displaced in the direction of arrows D and E, due to its large enough mass. Here, the signal input to the oscillating arm 21 is inverted in potential and reversed in phase, compared to the one input to the oscillating arm 41, while the frequency is the same. Therefore, the vibrating arm 21 oscillates in the transversal second-order mode in the direction of arrows D' and E', having the oscillation nodes at the vicinity of the junction of the vibrating arm 21 and the base 20, as well as at the vicinity of the junction of the vibrating arm 21 and the added mass 25. At the same time, the vibrating arm 41 oscillates in the transversal second-order mode in a reversed-phase as that of the oscillating arm 21, having the oscillation nodes at the vicinity of the junction of the vibrating arm 41 and the base 45, as well as at the vicinity of the junction of the vibrating arm 41 and the added mass 25.

In the aforementioned structure according to the second embodiment, the acceleration sensor 40 has the dual anchor structure, including the vibrating bodies 10 and 11 that face each other, having the added mass 25 therebetween. At this time, the oscillating arms 21 and 41 are in a high-order transversal oscillation mode, oscillating linearly and transversally in a reversed-phase. Consequently, a vibrating body is provided with a good oscillation balance, thereby obtaining a high-Q.

If acceleration is impressed in the y-axis direction, one of the oscillating arms 21 and 41 facing each other receives contracting stress and the other receives tensile stress. In such structure, there is an effect to negate the influence of the temperature-frequency characteristics, by detecting the resonant frequency differential of both vibrating bodies.

Third Embodiment

An acceleration sensor according to a third embodiment will now be described with reference to drawings. The third embodiment is peculiar in that the constant modulus material is used, while the aforementioned first and the second embodiments uses quartz as a vibrating body. In the third embodiment, the same concept as that of the first and the second embodiments can be applied to the forming of the vibrating body. Here, the description of the third embodiment exemplifies the vibrating body with the same shape as that of the first embodiment (refer to FIGS. 1A and 1B).

Figures 7A, 7B:
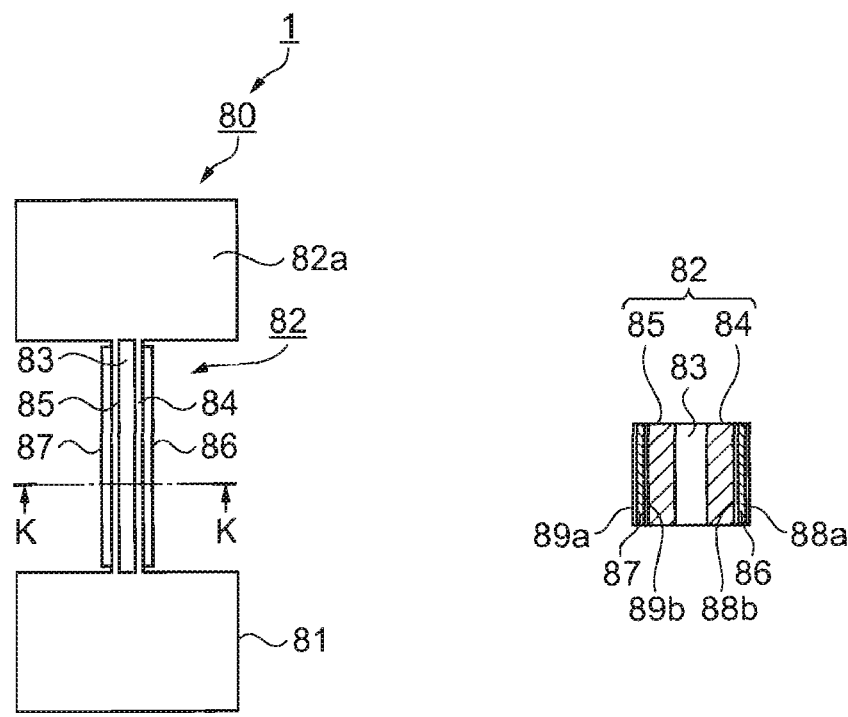
FIGS. 7A and 7B show an acceleration sensor according to another embodiment, where

FIGS. 7A and 7B show a vibrating body according to the third embodiment, where FIG. 7A is a front elevational view thereof, and FIG. 7B is a sectional view of a section K-K in FIG. 7A. Referring to FIGS. 7A and 7, a vibrating body 80 is formed including an oscillating arm 82 extending vertically from one side of a base 81. The base 81 is an anchor for anchoring the vibrating body 80 to the un-illustrated pedestal of a package. A through hole 83 is opened in the widthwise center of the oscillating arm 82, penetrating through in the thickness direction, and extending long along its longitudinal direction.

Examples of the constant modulus materials used for the vibrating body 80 include nickel, iron, chromium, titanium, elinvar alloys formed using those elements, and iron-nickel alloy. These materials are selected in accordance with the desired resonant frequency and sizes.

By providing the through hole 83, the oscillating arm 82 is divided into oscillating blocks 84 and 85. The distal ends of the oscillating blocks 84 and 85 are coupled at an added mass 82*a*. Piezoelectric films 86 and 87 are formed on the outer lateral surfaces of these oscillating blocks 84 and 85. As shown in FIG. 7B, the piezoelectric film 86 includes an upper electrode 88*a* and a lower electrode 88*b* formed on the front and the back surfaces of the piezoelectric film 86. Moreover, un-illustrated insulation film is formed between the lower electrode 88*b* and the outer lateral surface of the oscillating arm 84.

At the same time, the piezoelectric film 87 includes an upper electrode 89*a* and a lower electrode 89*b* formed on the front and the back surfaces of the piezoelectric film 87. Moreover, un-illustrated insulation film is formed between the lower electrode 89*b* and the outer lateral surface of the oscillating arm 85.

By inputting excitation signals, one having an inverted potential from the other, to the piezoelectric films 86 and 87 respectively, the oscillating arm 82 oscillates in the transversal second-order mode, as in the first embodiment, and continues a stable oscillation in a predetermined resonance frequency.

Examples of the materials used for the piezoelectric films 86 and 87 include lead titanate ($PbTiO_3$), lead titanate zirconate (PZT; registered trademark), and zinc oxide (ZnO).

The third embodiment described above also provides effects described in the first embodiment. It further provides effects such as the increase in a structural strength of the vibrating body 80, due to the usage of the constant modulus materials, so that, even the cross-sectional areas of the oscillating blocks 84 and 85 are decreased, the vibrating body 80 is still capable of the detection at the strongly accelerated regions.

Fourth Embodiment

An acceleration sensor according to a fourth embodiment will now be described with reference to drawings. The fourth embodiment is peculiar in that an oscillating arm divided into two blocks by a through hole is curved in advance.

Figure 8A:
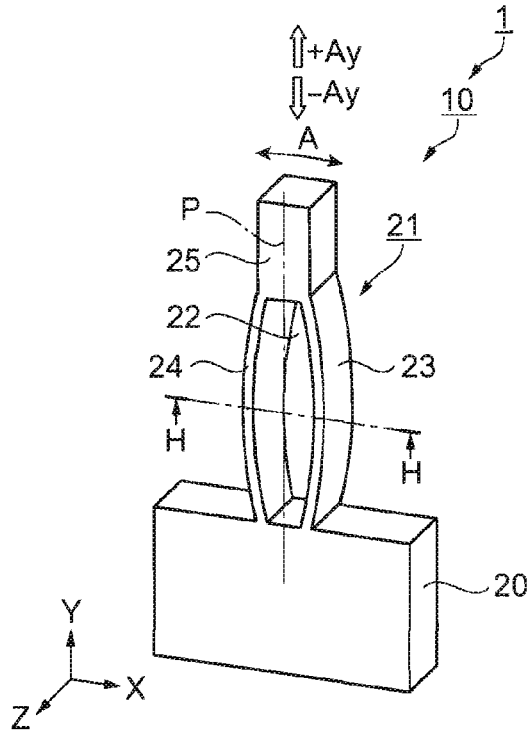
FIGS. 8A to 8D show a schematic structure of an acceleration sensor according to another embodiment, where
Figure 8D:
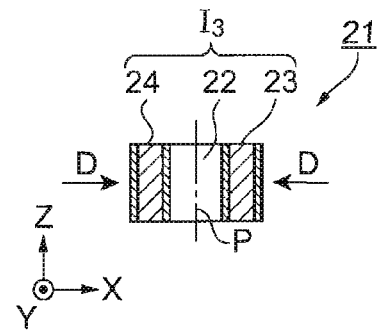
Figure 8B:
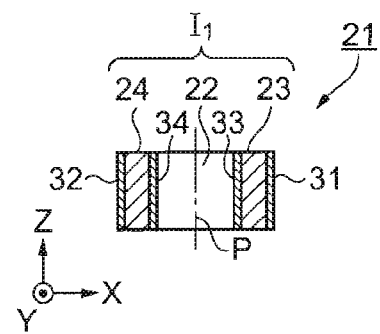
Figure 8C:
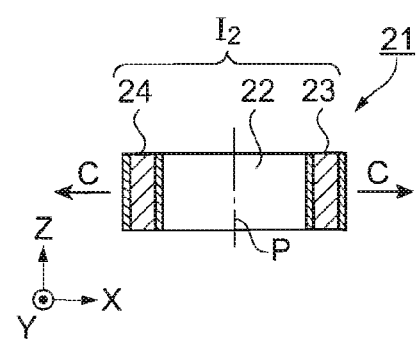

FIGS. 8A to 8D show a schematic structure of an acceleration sensor according to the fourth embodiment, where FIG. 8A is perspective view thereof, FIGS. 8B to 8D are sectional views of a section H-H in FIG. 8A. FIGS. 8A and 8B illustrate a state without acceleration. Referring now to FIGS. 8A and 8B, a vibrating body 10 which functions as an acceleration sensor has the single anchor structure formed including the base 20 and the oscillating arm 21 extending from one side of the base 20, both being coplanar on a z-cut quartz expanding in x-y plane.

The oscillating arm 21 includes, at the widthwise center thereof (x-axis direction), the through hole 22 having an approximately oval shape stretching along the longitudinal (y-axis) direction, and dividing the oscillating arm 21 into two blocks, thereby forming the oscillating blocks 23 and 24. The oscillating blocks 23 and 24 are formed, curved along the shape of the through hole 22, bending respectively toward +x axis and −x axis directions. Here, the oscillating blocks 23 and 24 are symmetric to the central axis P of the vibrating arm 21. Moreover, the distal ends of the oscillating arms 23 and 24 are coupled at the added mass 25.

The excitation electrodes 31 to 34 are disposed on the lateral surfaces of the oscillating blocks 23 and 24. The structure of the excitation electrodes 31 to 34 are the same as the one illustrated in FIG. 1B, and therefore the description is omitted.

Here, if the un-illustrated oscillation circuit inputs excitation signals to the excitation electrodes 31 to 34, the oscillating arm 21 oscillates linearly and transversally in the direction of the arrow A in a predetermined frequency, having the vicinity of a junction of the oscillating arm 21 and the base 20 as a node of oscillation as in the single anchor structure.

The resonant frequency fn of the oscillating arm 21 formed as above is given by the following formula (1).

Formula (1)

$$f_n = \frac{\alpha}{L^2}\sqrt{\frac{EI}{\rho S}} \quad (1)$$

Here, α is a constant determined by conditions such as supporting condition of the vibrating body, L is a length of the vibrating body, E is a longitudinal modulus coefficient, I is a coefficient that changes according to the cross-sectional shape (sectional second-order moment I), ρ is a density of the vibrating body 10, and S is a cross-sectional area of the vibrating body. This formula (1) indicates that the resonant frequency fn changes in accordance with the change of the second moment of area I, in vibrating bodies where the material and the shape thereof is invariable.

Thereafter, the reaction when the acceleration sensor 1 is accelerated the with acceleration +Ay in the y-axis direction will be described.

FIG. 8C is a sectional view of the oscillating blocks 23 and 24, when the acceleration +Ay is impressed in the y-axis direction. Referring now to FIGS. 8A and 8C, if the acceleration +Ay is impressed to the acceleration sensor 1, the oscillating arm 21 is compressed in the −y-axis direction, due to the inertial effect of the added mass 25 caused by the base 20 being anchored to the un-illustrated pedestal.

The oscillating blocks 23 and 24 are then compressed in the axis direction, the rigidity thereof being declined due to the through hole 22 dividing the oscillating arm 21 into two. As a result, as shown in FIG. 8C, the oscillating blocks 23 and 24 distort and curve outward, in the direction of the arrow C. At this time, since the oscillating blocks 23 and 24 are curved in advance, they bulge more flexibly in greater volume by the acceleration +Ay.

The state of the oscillating arm 21 shown in FIG. 8C is illustrated as the second moment of area $I_2$ when the acceleration +Ay is impressed.

When comparing the second moment of area $I_1$ with the second moment of area $I_2$, respectively representing the state of the oscillating arm 21 without acceleration shown in FIG. 8A and the state with the acceleration +Ay shown in FIG. 8C, the relationship thereof is $I_2 > I_1$. In other words, the length in the x-axis direction of the second moment of area $I_2$ is larger than the other. According to formula (1), when the acceleration +Ay is impressed, the resonant frequency increases, having the second moment of area I as the only variable. Therefore, by detecting the resonant frequency variability, the magnitude of acceleration is obtained.

When the acceleration −Ay working in the opposite direction to the acceleration +Ay is impressed, the oscillating arm 21 is stretched in the +Y direction due to the inertial effect of the added mass 25. The length of the oscillating blocks 23 and 24 in the x-axis direction becomes smaller, deforming in the direction of an arrow D as shown in FIG. 8D. Second moment of area $I_3$ represents the state where acceleration −Ay is impressed. The second moment of area $I_3$ becomes smaller than the second moment of area $I_1$ without acceleration.

When comparing the second moment of area $I_1$, the second moment of area $I_2$, and second moment of area $I_3$, the relation ship therebetween is $I_2 > I_1 > I_3$, the $I_1$ through $I_3$ respectively representing the state of the oscillating arm 21 without acceleration, with the acceleration +Ay, and with the acceleration −Ay.

In other words, if +Ay is impressed, the resonant frequency increases, and if −Ay is impressed, the resonant frequency decreases.

When the acceleration +Ay and/or −Ay is impressed, it can be detected also in the case described in the first embodiment where the oscillating arm 21 is formed linearly (refer to FIG. 1A), due to the change of the resonant frequency fn caused by the similar reason as that of the aforementioned fourth embodiment.

However, when comparing the shape of the oscillating blocks 23 and 24 in the first embodiment to that of the fourth embodiment, the ones according to the fourth embodiment are curved in advance. Therefore, when the same magnitude of acceleration is impressed, the amount of deformation is larger in the curved oscillating blocks 23 and 24, thereby increasing the variability of the second moment of area I. Consequently, the acceleration according to the fourth embodiment has higher detection sensitivity.

According to the fourth embodiment described above, by forming the oscillating blocks 23 and 24 curved in advance, the amount of variability of the resonant frequency fn increases, due to the increase in the amount of deformation of the oscillating blocks 23 and 24 of the oscillating arm 21 caused by the acceleration in the y-axis direction, thereby increasing the detection sensitivity.

While the known aforementioned acceleration sensor bends and deforms due to the weight at the end of the cantilever, this acceleration sensor includes the oscillating blocks 23 and 24 which distort, curving outward by acceleration. Therefore, this acceleration sensor is capable of detection in a strongly accelerated area.

Fifth Embodiment

An acceleration sensor according to a fifth embodiment will now be described with reference to drawings. The fifth embodiment is peculiar in that the added mass 25 is even larger compared to that of the fourth embodiment. Here, the oscillating blocks 23 and 24 have a similarly curved shape as that of the fourth embodiment (refer to FIG. 8A).

Figure 9:
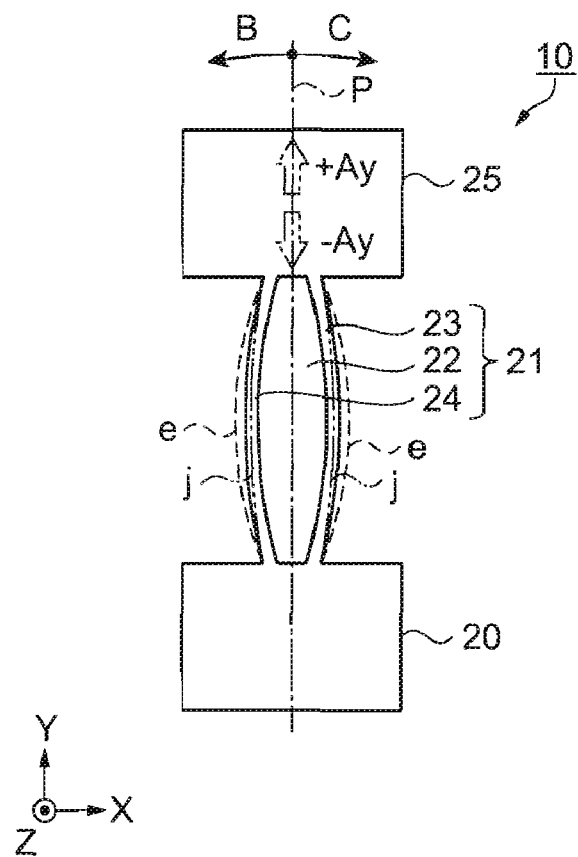
FIG. 9 is a plan view illustrating a schematic structure of an acceleration sensor according to another embodiment.

FIG. 9 is a plan view illustrating a schematic figure of the acceleration sensor according to the fifth embodiment. Referring to FIG. 9, the added mass 25 is formed at the distal ends (free ends) of the oscillating blocks 23 and 24. The planer size of the added mass 25 is set so that its mass is equal to or larger than that of the base 20. If the oscillating arm 21 receives an excitation signal in the above structure, it resonates in the transversal second-order mode, not linearly and transversally as described in the fourth embodiment, since the added mass 25 is large.

That is to say, when the excitation signal is input into the oscillating blocks 23 and 24, the distal end of the added mass 25 attempts to oscillate in the direction of the arrow C. However, due to the presence of the added mass 25, the oscillating blocks 23 and 24 hardly moves, and therefore the blocks oscillate in the transversal second-order mode.

Similarly, when the distal end of the added mass 25 attempts to oscillate to the direction of the arrow B, it hardly moves due to the presence of the large added mass 25, and the oscillating blocks 23 and 24 oscillates in the transversal second-order mode.

By making the mass of the added mass 25 large enough, the movement of the distal end of the oscillating arm 21 becomes significantly small, the oscillating arm 21 forming the pseudo-dual anchor structure between the added mass 25 and the base 20. Consequently, the vibrating arm 21 has the high-order oscillation mode, having the oscillation nodes at the vicinity of the junction of the vibrating arm 21 and the base 20, as well as at the junction of the vibrating arm 21 and the added mass 25.

If the +Ay acceleration in the +y axis direction is impressed to the vibrating body 10 of the above structure, the compression force works on the oscillating blocks 23 and 24 causing the buckling distortion thereof (shown in a dotted line e in FIG. 9), due to the inertial effect of the added mass 25, thereby making the second moment of area I larger, increasing the resonant frequency. If the −Ay acceleration in the −y axis direction is impressed, the oscillating blocks 23 and 24 are stretched (shown in a dashed-two dotted line j in FIG. 9), thereby making the second moment of area I smaller, decreasing the resonant frequency.

Therefore, according to the aforementioned fifth embodiment, by providing the added mass 25 with sufficient mass, the similar effect as that of the fourth embodiment is attained also in the high-order oscillation mode. Further, since the mass of the added mass 25 is sufficient, it is possible to further increase the detection sensitivity of the acceleration.

The size of the added mass 25 may optionally be set as long as it forms the aforementioned pseudo-dual anchor structure.

Sixth Embodiment

An acceleration sensor according to a sixth embodiment will now be described with reference to drawings. The sixth embodiment is peculiar in that the acceleration sensor has the dual anchor structure, while the ones according to the fourth and the fifth embodiments described above have either the single anchor structure or the pseudo-dual anchor structure.

Figure 10:
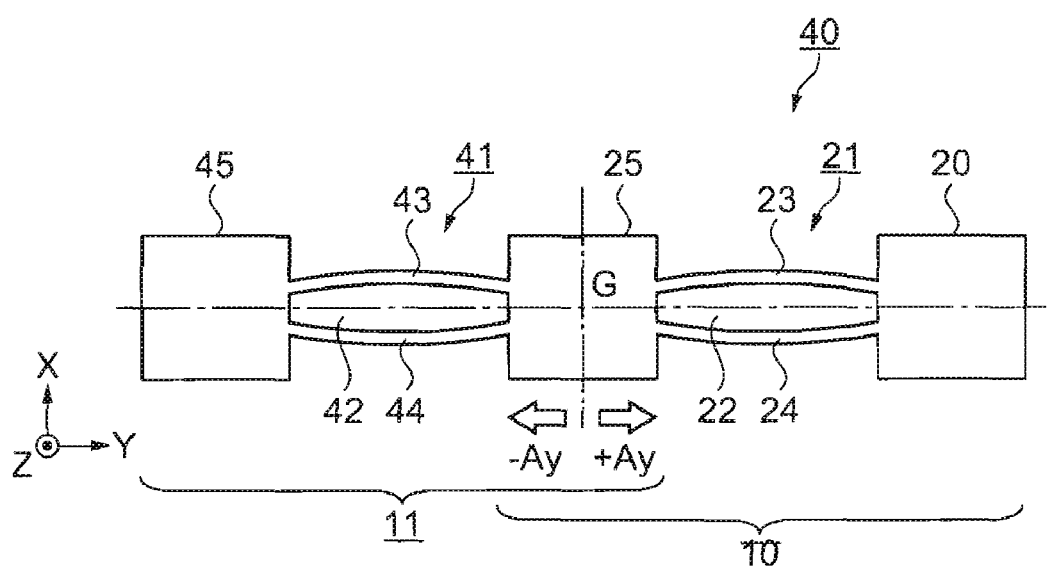
FIG. 10 is a plan view illustrating a schematic structure of an acceleration sensor according to another embodiment.

FIG. 10 is a plan view illustrating a schematic figure of the acceleration sensor according to the sixth embodiment. Referring to FIG. 10, the acceleration sensor 40 is formed including two vibrating bodies 10 and 11, coupled linearly at the added mass 25 being shared therebetween.

As shown in FIG. 10, the vibrating body 10 is at the right side from a center of mass G in the acceleration sensor 40, and the vibrating body 11 is at the left side. The vibrating body 10 includes the base 20, the added mass 25, and the oscillating arm 21 that has curved oscillating blocks 23 and 24. The vibrating body 11 includes the base 45, the added mass 25, and the oscillating arm 41 that has curved oscillating blocks 43 and 44.

The vibrating body 10 and the vibrating body 11 of the acceleration sensor 40 are point-symmetric with respect to the center of mass G present in the added mass 25, and the acceleration sensor 40 has the dual anchor structure where the base 20 and the base 45 are anchored to an un-illustrated pedestal. In other words, a pair of vibrating bodies 10 described in the fifth embodiment (refer to FIG. 9) is disposed linearly having the added mass 25 therebetween.

Here, the oscillating blocks 23 and 24 receive an excitation signal, and the oscillating blocks 43 and 44 receive another excitation signal with an inverted potential, reversed phase, and the same frequency as that of the oscillating blocks 23 and 24. The consequent oscillation is very minimal due to the sufficiently large mass present in the added mass 25, and the oscillating arm 21 oscillates in a transversal second-order mode, having the oscillation nodes at the vicinity of the junction of the vibrating arm 21 and the base 20, and of the junction of the vibrating arm 21 and the added mass 25. At the same time, the vibrating arm 41 has the oscillation nodes at the vicinity of the junction of the vibrating arm 41 and the base 45, as well as at the vicinity of the junction of the vibrating arm 41 and the added mass 25, and oscillates in a transversal second-order mode in reversed phase as that of the oscillating arm 21.

If the −Ay acceleration in the −y axis direction is impressed, the compression force works on the oscillating blocks 23 and 24, causing the buckling distortion thereof, due to the inertial effect of the added mass 25, thereby making the second moment of area I larger, while increasing the resonant frequency. The expansion force works on the oscillating blocks 43 and 44, thereby making the second moment of area I smaller, reducing the resonant frequency. By detecting the resonant frequency differential of both vibrating bodies, the magnitude of acceleration is detected, thereby the direction of acceleration is learned.

The +Ay acceleration in the +y axis direction causes the effect opposite from that of the acceleration −Ay, decreasing the resonant frequency of the vibrating body 10 and increasing the resonant frequency of the vibrating body 11.

According to the aforementioned sixth embodiment, the acceleration sensor 40 with the dual anchor structure is formed, including the counterfacing pair of vibrating bodies 10 and 11, having the shared added mass 25 therebetween. At this time, the oscillating arms of the vibrating bodies 10 and 11 are in a high-order transversal oscillation mode, each oscillating in a reversed-phase from the other, thereby forming a vibrating body with good oscillation balance, thus obtaining a high-Q and a resistance to an external disturbance.

If acceleration is impressed in the y-axis direction, one of the vibrating bodies 10 and 11 that face each other receives contracting stress and the other receives tensile stress. In such structure, there is an effect to negate the influence of the temperature-frequency characteristics.

Seventh Embodiment

An acceleration sensor according to a seventh embodiment will now be described with reference to drawings. The seventh embodiment is peculiar in that each of the plurality of oscillating arms formed by being divided by a through hole further includes a through hole. In this embodiment, the structure having two oscillating arms is described as an example.

Figure 11A:
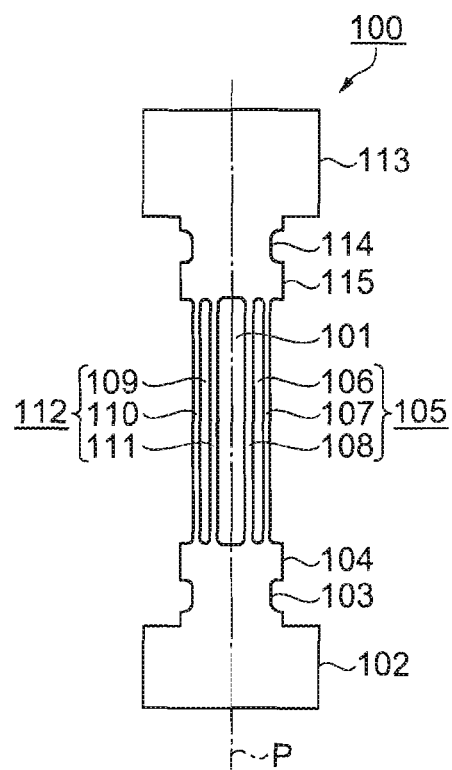
FIGS. 11A and 11B show an acceleration sensor according to another embodiment, where
Figure 11B:
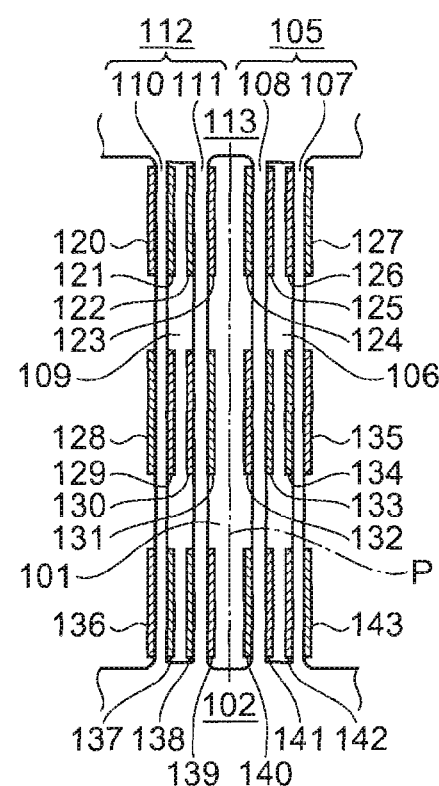

FIGS. 11A and 11B show an accelerator according to the seventh embodiment, where FIG. 11A is a front elevational view thereof, and FIG. 11B is a partial front elevational view magnifying a structure of excitation electrodes. Referring to FIG. 11A, a vibrating body 100 functioning as an acceleration sensor has a through hole 101 which divides the vibrating body 100 into two oscillating arms 105 and 112, that are formed in parallel to each other, extending out from one side of a base 102. The distal ends of the arms are coupled together by an added mass 113.

The through hole 106 is opened in the oscillating arm 105, dividing it into oscillating blocks 107 and 108, and a through hole 109 is opened in the oscillating arm 112, dividing it into oscillating blocks 110 and 111. Here, the lengths of the through holes 106 and 109 are approximately equal to the length of the oscillating arms 105 and 112. Moreover, the oscillating arm 105 and the oscillating arm 112 are symmetric with respect to the central axis P.

The base 102 is formed including a junction 104 of the oscillating arms 105 and 112, as well as a constriction 103. The added mass 113 is formed including a junction 115 of the oscillating arms 105 and 112, as well as a constriction 114. The planer size of the added mass 113 is set so that its mass is equal to or larger than that of the base 102. As shown in FIG. 11B, excitation electrodes are formed on each lateral surface of the oscillating blocks 107, 108, 110, and 111.

The excitation electrodes are provided at the positions where the magnitude of deformation is larger when the oscillating blocks 107, 108, 110, and 111 oscillate. The positions with large deformation are in the vicinities of the base 102, the added mass 113, and the lengthwise center (outer side of the oscillation curve) of the oscillating arms. Excitation electrodes 127, 135, and 143 are formed on the outer lateral surface of the oscillating block 107, sequentially positioned from the side of the added mass 113. Excitation electrodes 126, 134, and 142 are formed on the inner lateral surface of the through hole 106, sequentially positioned from the side of the added mass 113.

Further, excitation electrodes 125, 133, and 141 are formed on the inner lateral surface of the through hole 106 of the oscillating blocks 108, sequentially positioned from the side of the added mass 113. Still further, excitation electrodes 124, 132, and 140 are formed on the lateral surface of the through hole 101, sequentially positioned from the side of the added mass 113.

At the same time, excitation electrodes 120, 128, and 136 are formed on the outer lateral surface of the oscillating block 110, sequentially positioned from the side of the added mass 113. Further, excitation electrodes 121, 129, and 137 are formed on the inner lateral surface of the through hole 109, sequentially positioned from the side of the added mass 113. Still further, excitation electrodes 122, 130, and 138 are formed on the inner lateral surface of the through hole 109 of the oscillating block 111, and excitation electrodes 123, 131, and 139 are formed on a lateral surface of the through hole 101, sequentially from the side of the added mass 113.

These excitation electrodes 124 through 127, 132 through 135, and 140 through 143 are formed to be symmetric with respect to the central axis P, having the image thereof in the excitation electrodes 120 through 123, 128 through 131, and 136 through 139. The same electric potential is provided to a first group of electrodes including the excitation electrodes 120, 123, 125, 126, 129, 130, 132, 135, 136, 139, 141, and 142. Similarly, the same electric potential is provided to a second group of electrodes including the excitation electrodes 121, 122, 124, 127, 128, 131, 133, 134, 137, 138, 140, and 143.

Figure 12:
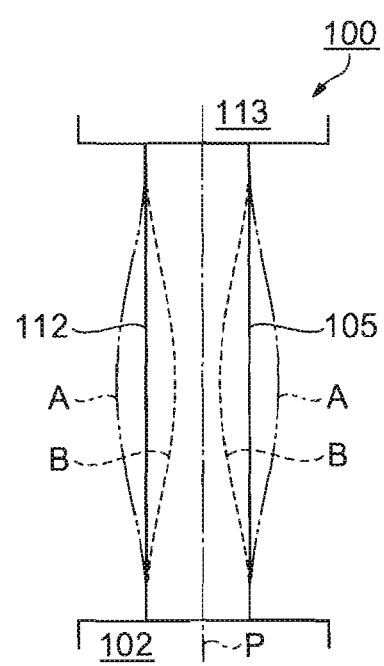
FIG. 12 is an explanatory drawing schematically illustrating a oscillation mode of a vibrating body according to the above embodiment.

FIG. 12 is an explanatory drawing schematically illustrating the oscillation mode of the vibrating body according to the seventh embodiment. The vibrating body 100 of this embodiment includes the added mass 113 with sufficient mass. Therefore, the added mass 113 which serves as a free end is hardly displaced, and forms the pseudo-dual anchor structure. In other words, the structure of the vibrating body 100 is similar to a double-ended tuning fork resonator. Therefore, if the excitation signals with inverted potentials are input into the first group of electrodes and to the second group of electrodes respectively, the oscillating arms 105 and 112 oscillate in a similar oscillation mode as that of the double-ended tuning fork resonator as shown in FIG. 12.

The disposition of the acceleration sensor vibrating body 100 is similar to a double dashed line A shown in FIG. 12, when the first group of electrodes receives the excitation signal with a positive potential, and the second group of electrodes receives the excitation signal with a negative potential. The disposition of the acceleration sensor vibrating body 100 is similar to an illustrated dotted line B, when the first group of electrodes receives the excitation signal with a negative potential, and the second group of electrodes receives the excitation signal with a positive potential. By repeating the above, the vibrating body 100 oscillates in the similar oscillation mode as that of the double-ended tuning fork resonator.

When the acceleration sensor is accelerated in the axis direction, the expansion-contraction stress occurs in the oscillating arms 105 and 112, and the second moment of area of the oscillating arms 105 and 112 changes. This causes the change in the resonant frequency, and this change is detected as acceleration.

The shape of the through holes 106 and 109, the position for opening them, and the arrangement of the excitation electrodes may vary in the seventh embodiment.

Eighth Embodiment

An acceleration sensor according to an eighth embodiment will now be described with reference to drawings. The eighth embodiment is peculiar in that through holes are opened at the vicinities of the junction between the oscillating arm and the base, as well as of the junction between the oscillating arm and the added mass. The structure of the eighth embodiment except for those of the through holes is the same as that of the seventh embodiment, and therefore the description is omitted. Like reference numerals designate like structure in the common constituents.

Figure 13A:
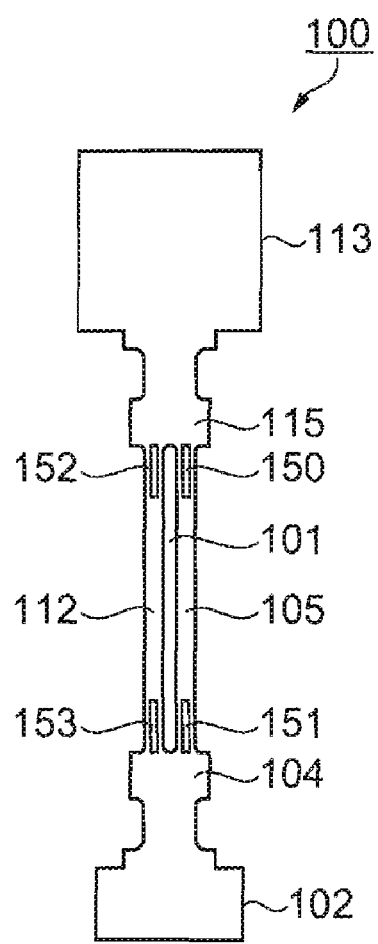
FIGS. 13A and 13B show a vibrating body included in acceleration sensor according to another embodiment, where
Figure 13B:
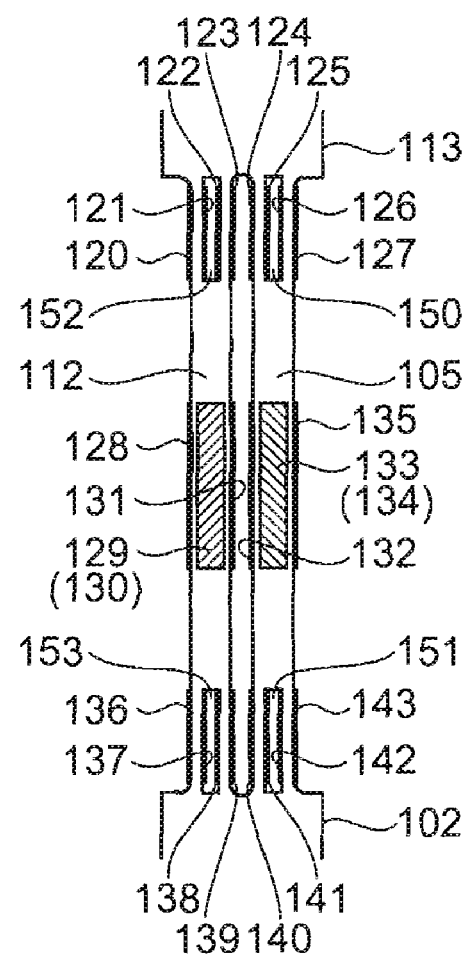

FIGS. 13A and 13B show a vibrating body functioning as an acceleration sensor according to this embodiment, where FIG. 13A is a front elevational view thereof, and FIG. 13B is a partial plan view illustrating a structure of excitation electrodes. Referring to FIG. 13A, through holes 150 and 151 are opened in the oscillating arm 105, and through holes 152 and 153 are opened in the oscillating arm 112.

The through holes 150 and 152 are provided in the vicinity of the added mass 113 in the oscillating arms 105 and 112 respectively (the vicinity of the junction 115). The through holes 150 and 152 are provided in a range up to approximately 30% of the total length of the oscillating arms 105 and 112 from their end at the added mass side. The through holes 151 and 153 are provided in the vicinity of the base 102 (the junction 104). The through holes 151 and 153 are provided in a range up to approximately 30% of the total length of the oscillating arms 105 and 112 from their end at the base side. The through holes 150 to 153 are opened at positions where the deformation occurred upon the transversal oscillation of the oscillating arms 105 and 112 is the largest. The excitation electrodes are disposed on the internal lateral surface of the through holes 150 to 153, as well as on the lateral surface of the oscillating arms 105 and 112.

As shown in FIG. 13B, the excitation electrodes 127, 135, and 143 are formed on the outer lateral surface of the oscillating arm 105, sequentially from the side of the added mass 113. The excitation electrodes 125 and 126 are formed on the inner lateral surface of the through hole 150, and the excitation electrodes 141 and 142 are formed on the inner lateral surface of the through hole 151. Moreover, excitation electrodes 124, 132, and 140 are formed on the inner lateral surface of the oscillating arm 105, sequentially positioned from the side of the added mass 113.

At the same time, the excitation electrodes 123, 131, and 139 are formed on the inner lateral surface of the oscillating arm 112, sequentially from the side of the added mass 113; the excitation electrodes 121 and 122 are formed on the inner lateral surface of the through hole 152; and the excitation electrodes 137 and 138 are formed on the inner lateral surface of the through hole 153. Further, the excitation electrodes 120, 128, and 136 are formed on the outer lateral surface of the oscillating arm 112, sequentially from the side of the added mass 113.

Still further, the excitation electrodes 129 and 130 are formed on both the front and the back surfaces of the oscillating arm 112, and the excitation electrode 133 and 134 are formed on the front and the back surfaces of the oscillating arm 105. These excitation electrodes 129, 130, 133, and 134 are provided at approximately the same lengthwise position as that of the excitation electrodes 128, 131, 132, and 135 formed on the lateral surfaces.

These excitation electrodes 120 through 143 are disposed approximately at the same positions as that of the seventh embodiment (refer to FIG. 11B). In other words, the excitation electrodes 120 through 143 are disposed at the positions where the magnitude of deformation is larger during the oscillation of the oscillating arms 105 and 112. The same electric potential is provided to the first group of electrodes including the excitation electrodes 120, 123, 125, 126, 129, 130, 132, 135, 136, 139, 141, and 142. Similarly, the same electric potential is provided to the second group of electrodes including the excitation electrodes 121, 122, 124, 127, 128, 131, 133, 134, 137, 138, 140, and 143.

Therefore, if the first group of electrodes receives the excitation signal with a positive potential, while the second group of electrodes receives the excitation signal with a negative electrode, then the disposition of the vibrating body 100 is similar to the double dashed line A shown in the seventh embodiment (refer to FIG. 12). The disposition of the acceleration sensor vibrating body 100 is similar to the illustrated dotted line B, when the first group of electrodes receives the excitation signal with a negative potential, and the second group of electrodes receives the excitation signal with a positive potential. By repeating the above, the vibrating body 100 oscillates in the similar oscillation mode as that of the double-ended tuning fork resonator.

Ninth Embodiment

An acceleration sensor according to a ninth embodiment will now be described with reference to drawings. The ninth embodiment is peculiar in that through holes are provided also at the lengthwise center of the oscillating arms, while the eighth embodiment (refer to FIG. 13) are not. The structure of the ninth embodiment except for the through holes is the same as that of the eighth embodiment, and therefore the description is omitted. Like reference numerals designate like structure in the common constituents.

Figure 14A:
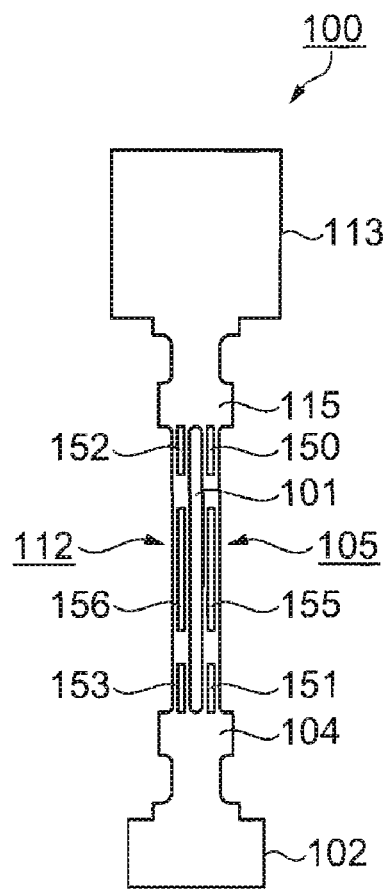
FIGS. 14A and 14B show a vibrating body included in acceleration sensor according to another embodiment, where
Figure 14B:
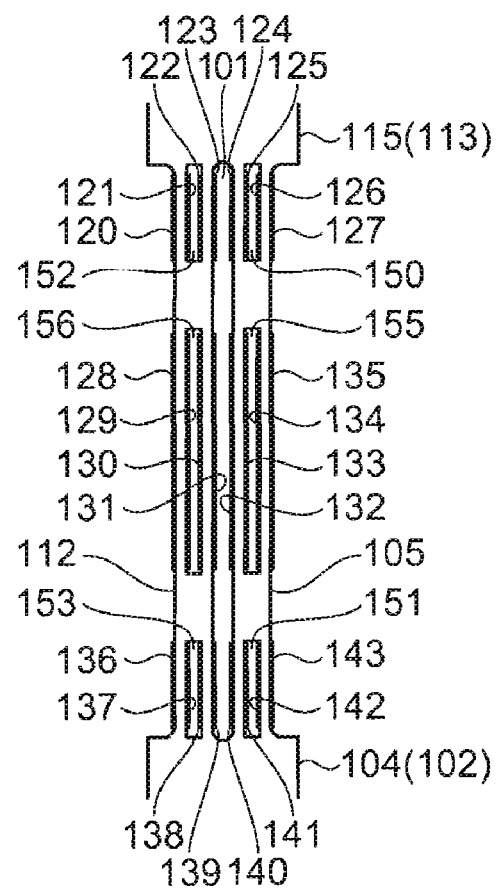

FIGS. 14A and 14B show a vibrating body functioning as an acceleration sensor according to the ninth embodiment, where FIG. 14A is a front elevational view thereof, and FIG. 14B is a partial plan view illustrating a structure of excitation electrodes. Referring to FIG. 14A, the through holes 150 and 151, as well as a through hole 155 are opened in the oscillating arm 105, and the through holes 152 and 153, as well as a through hole 156 are opened in the oscillating arm 112.

The through holes 150 and 152 are provided in the vicinity of the added mass 113 in the oscillating arms 105 and 112 respectively (the vicinity of the junction 115). The through holes 151 and 153 are provided in the vicinity of the base 102 (the junction 104). The through holes 155 and 156 are provided at the lengthwise center of the oscillating arms 105 and 112. The through holes 155 and 156 are provided in a range including the lengthwise center of the oscillating arms 105 and 112, the range distributed in approximately 60% of the total length of the oscillating arms.

These through holes 150 to 153, 155, and 156 are opened at positions where the deformation occurred upon the transversal oscillation of the oscillating arms 105 and 112 is the largest. The through holes 155 and 156 are positioned at the outer side of the oscillation curve. The excitation electrodes are disposed on the lateral surfaces of the oscillating arms 105 and 112, as well as on the internal lateral surfaces of the through holes 150-153, 155, and 156.

As shown in FIG. 14B, the excitation electrodes 127, 135, and 143 are formed on the outer lateral surface of the oscillating arm 105, sequentially from the side of the added mass 113. The excitation electrodes 125 and 126 are formed on the inner lateral surface of the through hole 150; the excitation electrodes 141 and 142 are formed on the inner lateral surface of the through hole 151; and the excitation electrodes 133 and 134 are formed on the inner lateral surface of the through hole 155. Moreover, excitation electrodes 124, 132, and 140 are formed on the inner lateral surface of the oscillating arm 105, sequentially positioned from the side of the added mass 113.

At the same time, the excitation electrodes 123, 131, and 139 are formed on the inner lateral surface of the oscillating arm 112, sequentially from the side of the added mass 113; the excitation electrodes 121 and 122 are formed on the inner lateral surface of the through hole 152; the excitation electrodes 137 and 138 are formed on the inner lateral surface of the through hole 153; and the excitation electrodes 129 and 130 are formed on the inner lateral surface of the through hole 156. Further, the excitation electrodes 120, 128, and 136 are formed on the outer lateral surface of the oscillating arm 112, sequentially from the side of the added mass 113.

These excitation electrodes are disposed approximately at the same positions as that of the seventh embodiment (refer to FIG. 11B), as well as that of the eighth embodiment (refer to FIG. 13B). In other words, the excitation electrodes are disposed at the positions where the magnitude of deformation is larger when the oscillating arms 105 and 112 oscillate. The same electric potential is provided to the first group of electrodes including the excitation electrodes 120, 123, 125, 126, 129, 130, 132, 135, 136, 139, 141, and 142. Similarly, the same electric potential is provided to the second group of electrodes including the excitation electrodes 121, 122, 124, 127, 128, 131, 133, 134, 137, 138, 140, and 143.

Therefore, if the first group of electrodes receives the excitation signal with a positive potential, while the second group of electrodes receives the excitation signal with a negative electrode, then the disposition of the vibrating body 100 is similar to the double dashed line A shown in the seventh embodiment (refer to FIG. 12). The disposition of the acceleration sensor vibrating body 100 is similar to the illustrated dotted line B, when the first group of electrodes receives the excitation signal with a negative potential, and the second group of electrodes receives the excitation signal with a positive potential. By repeating the above, the vibrating body 100 oscillates in the similar oscillation mode as that of the double-ended tuning fork resonator.

As described, according to the seventh embodiment, the through holes 106 and 109 are provided to the oscillating arms 105 and 112, extending to the entire length thereof. According to the eighth embodiment, the through holes 150 to 153 are provided at the vicinities of the base 20 and the added mass 113; and according to the ninth embodiment, the through holes 155 and 156 are further provided in the lengthwise center of the oscillating arms 105 and 112. Consequently, those through holes are provided at the positions where the magnitude of deformation generated by the oscillation is large. This decreases the cross-sectional areas of the oscillating arms 105 and 112, and increases the level of stress being generated. Moreover, the level of disposition increases in the oscillating arms 105 and 112 during the acceleration. Therefore, the amount of resonant frequency variability increases, thereby increasing the detection sensitivity.

Further, the field effect increases since the distance between the excitation electrodes becomes shorter than that of the first to sixth embodiments. This provides an effect of lowering the power consumption.

The excitation electrodes 120 through 143 are coupled into two groups, i.e. the first group of electrodes and the second group of electrodes. At this time, according to the eighth and the ninth embodiments, the distances between the adjacent through holes provide, on both front and back surfaces of the oscillating arms 105 and 112, a space for interconnecting electrodes. This provides the vibrating body another effect that the interconnection of the coupling electrodes is easy.

Tenth Embodiment

An acceleration sensor according to a tenth embodiment will now be described with reference to drawings. The tenth embodiment is peculiar in that the acceleration sensor has the dual anchor structure, while the acceleration sensors (vibrating body) according to the seventh to ninth embodiments have the pseudo-dual anchor structure.

Figure 15:
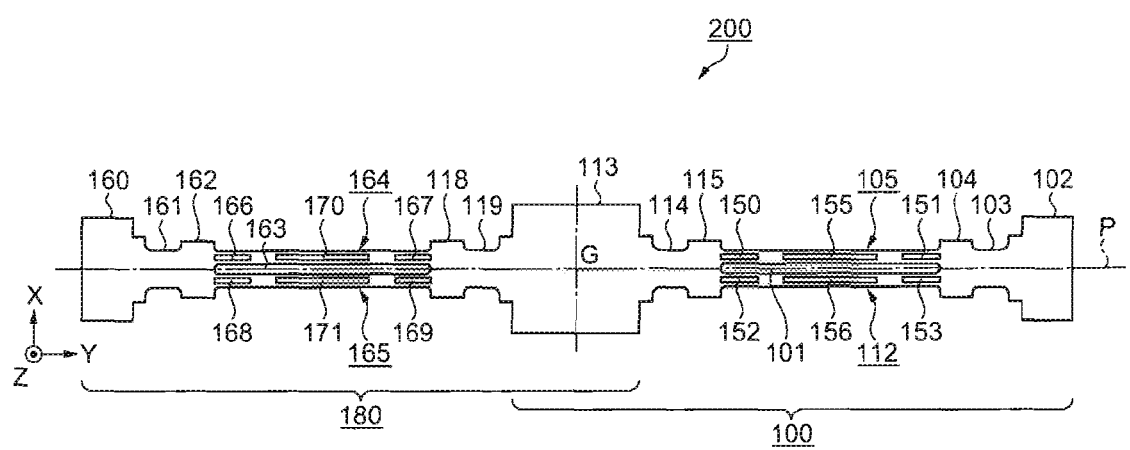
FIG. 15 is a front elevational view illustrating an acceleration sensor according to another embodiment.

FIG. 15 is a front elevational view illustrating the accelerator according to the tenth embodiment. Referring to FIG. 15, an acceleration sensor 200 is formed including the vibrating body 100 and a vibrating body 180, coupled linearly at the added mass 113 being shared therebetween.

As shown in FIG. 15, the vibrating body 100 is at the right side from the center of mass G in the acceleration sensor 200, and the vibrating body 180 is at the left side, the vibrating body 100 including the base 102, the oscillating arms 105 and 112, and the added mass 113, and the vibrating body 180 including a base 160, oscillating arms 164 and 165, and the added mass 113. The oscillating arms 105 and 112 are formed as a result of the through hole 101 dividing the vibrating body 100. Moreover, the oscillating arm 105 includes the through holes 150, 151, and 155, and the oscillating arm 112 includes the through holes 152, 153, and 156.

At the same time, through holes 166, 167, and 170 are opened in the oscillating arm 164, and through holes 168, 169, and 169 are opened in the oscillating arm 165.

The base 102 is formed including the junction 104 of the oscillating arms 105 and 112, as well as the constriction 103. The added mass 113 is formed including a junction 115 of the oscillating arms 105 and 112, as well as the constriction 114.

Moreover, in the vibrating body 180, the base 160 is formed including a junction 162 of the oscillating arms 164 and 165, as well as a constriction 161. The added mass 113 is formed including a junction 118 of the oscillating arms 164 and 165, as well as a constriction 119.

The added mass 113 is shared between the vibrating body 100 and the vibrating body 180, in a way that the acceleration sensor becomes point-symmetric with respect to the center of mass G. That is to say, the acceleration sensor 200 has the dual anchor structure, having the base 102 and the base 160 as anchors, the vibrating body 100 and the vibrating body 180 both having the same structure coupled linearly, having the common added mass 113 therebetween. The planer size of the added mass 113 is such that its mass is equal to or larger than that of the bases 102 and 160. These vibrating bodies 100 and 180 have the same structure, including the structures of the excitation electrodes, as that of the ninth embodiment (refer to FIGS. 14A and 14B).

Here, the oscillating arms 105 and 112 receive an excitation signal, and the oscillating arms 164 and 165 receive another excitation signal with an inverted potential, reversed phase, and the same frequency as that of the oscillating arms 105 and 112. The consequent disposition is very minimal due to the sufficiently large mass present in the added mass 113, and the oscillating arms 105 and 112, as well as the oscillating arms 164 and 165 oscillate in a transversal second-order mode as shown in FIG. 12. Therefore, the oscillating arms 105 and 112 are point-symmetric with respect to the center of mass G, having the image thereof in the oscillating arms 164 and 165.

According to the tenth embodiment, the acceleration sensor 200 has the dual anchor structure, including the vibrating bodies 100 and 180 that face each other, having the added mass 113 therebetween. At this time, the oscillating arms 105 and 112, as well as the oscillating arms 164 and 165 have the high-order transversal oscillation mode, oscillating in a reversed-phase from one arm pair to the other, thereby forming a vibrating body with good oscillation balance, thereby the vibration body obtains a high-Q.

If acceleration is impressed, in the y-axis direction, to the two counterfacing pairs of oscillating arms, a first pair including the oscillating arms 105 and 112 and a second pair including the oscillating arms 164 and 165, one of the pair receives contracting stress, and the other pair receives tensile stress. In such structure, there is an effect to negate the influence of the temperature-frequency characteristics, by detecting the resonant frequency differential of both vibrating bodies.

According to the first through tenth embodiments, the through holes are provided on the vibrating bodies so as to divide the oscillating arms. The acceleration sensors with such structure detect the variability of the resonant frequency resulting either from the change in the second moment of area, or from the change of stress in the oscillating arms provided by the compression or expansion force caused by acceleration impressed thereto. As a result, the small-sized acceleration sensors are provided with a simple structure, high sensitivity, and fine temperature-frequency characteristics.

The entire disclosure of Japanese Patent Application Nos: 2006-279508, filed Oct. 13, 2006 and 2007-159831, filed Jun. 18, 2007 and 2007-017439, filed Jan. 29, 2007 are expressly incorporated by reference herein.

What is claimed is:

1. An acceleration sensor including a vibrating body, comprising:
    a base fixed to a pedestal;
    a plurality of oscillating arms extended in parallel to each other from the base in a beam-like shape, oscillating transversally in a planar direction at a predetermined resonant frequency; and
    an added mass formed immediately adjacent the plurality of oscillating arms and having a mass equal to or larger than that of the base which couples the plurality of oscillating arms at distal ends thereof,
    the plurality of oscillating arms each including:
    at least one through hole opened through a thickness direction at a widthwise center of the oscillating arm, the through hole extending in a lengthwise direction thereof, and
    an excitation means for exciting the oscillating arms, the excitation means being provided in a range within an internal surface of the through hole and within both lateral surfaces of at least one of the plurality of oscillating arms, the range including at least a position where a deformation caused by an oscillation is large,
    the base and the oscillating arms including the added mass being monolithic, and
    the acceleration sensor detecting a resonant frequency variability of the vibrating body caused by an inertial effect of the added mass under acceleration,
    wherein the excitation means is formed at least adjacent a junction of the plurality of oscillating arms and the base, adjacent a junction of the plurality of oscillating arms and the added mass, and on an inside surface and both side surfaces of the oscillating arms at lengthwise centers of the plurality of oscillating arms.

2. The acceleration sensor according to claim 1, wherein the through holes are opened in a vicinity of a junction of the plurality of oscillating arms and the base, as well as in a vicinity of a junction of the added mass and the plurality of oscillating arms.

3. The acceleration sensor according to claim 1, wherein the through holes are opened in:
    a vicinity of a junction of the plurality of oscillating arms and the base;
    a vicinity of a junction of the plurality of oscillating arms and the added mass; and
    lengthwise centers of the plurality of oscillating arms.

4. The acceleration sensor according to claim 1, wherein:
    a pair of vibrating bodies is provided, each vibrating body including the base, the oscillating arm, and the added mass;
    the pair of added masses being a shared added mass; and
    the pair of vibrating bodies being coupled linearly so as to be point-symmetric with respect to a center of mass of the shared added mass.

5. The acceleration sensor according to claim 1, wherein the vibrating body is formed with quartz.

6. The acceleration sensor according to claim 1, wherein the vibrating body is formed with a constant modulus material, and wherein a piezoelectric film is formed on a lateral surface of the oscillating arm.

* * * * *